US012638586B2

(12) United States Patent
Kimura et al.

(10) Patent No.: US 12,638,586 B2
(45) Date of Patent: **\*May 26, 2026**

(54) OPTICAL INTERFEROMETRIC RANGE SENSOR

(71) Applicant: OMRON Corporation, Kyoto (JP)

(72) Inventors: Kazuya Kimura, Kyoto (JP); Masayuki Hayakawa, Kyoto (JP); Yusuke Nagasaki, Kyoto (JP); Seishiro Kojima, Kyoto (JP)

(73) Assignee: OMRON Corporation, Kyoto (JP)

( \* ) Notice: Subject to any disclaimer, the term of this patent is extended or adjusted under 35 U.S.C. 154(b) by 167 days.

This patent is subject to a terminal disclaimer.

(21) Appl. No.: 18/173,110

(22) Filed: Feb. 23, 2023

(65) Prior Publication Data

US 2023/0288562 A1 Sep. 14, 2023

(30) Foreign Application Priority Data

Mar. 11, 2022 (JP) ................................. 2022-038295

(51) Int. Cl.
*G01S 17/34* (2020.01)
*G01B 9/02003* (2022.01)
(52) U.S. Cl.
CPC .......... *G01S 17/34* (2020.01); *G01B 9/02003* (2013.01)
(58) Field of Classification Search
CPC .......... G01S 17/34; G01S 17/08; G01S 7/481; G01B 9/02003; G01B 2210/60;
(Continued)

(56) References Cited

U.S. PATENT DOCUMENTS

| | | | |
|---|---|---|---|
| 4,892,406 | A | 1/1990 | Waters |
| 2007/0009197 | A1 | 1/2007 | Poland et al. |

(Continued)

FOREIGN PATENT DOCUMENTS

| | | |
|---|---|---|
| CN | 102047070 A | 5/2011 |
| CN | 103326219 A | 9/2013 |

(Continued)

OTHER PUBLICATIONS

Extended European search report (EESR) issued on Jul. 24, 2023 in a counterpart European patent application.

(Continued)

*Primary Examiner* — Tarifur R Chowdhury
*Assistant Examiner* — Akbar H. Rizvi
(74) *Attorney, Agent, or Firm* — METROLEX IP LAW GROUP, PLLC; Robert L. Scott, Esq.

(57) ABSTRACT

An optical interferometric range sensor includes a light source that emits light with a changing wavelength, an interferometer that receives the light emitted from the light source and generates interference light based on measurement light emitted from a sensor head to a measurement target and reflected from the measurement target and reference light traveling on an optical path at least partially different from an optical path of the measurement light, a light receiver that receives the interference light from the interferometer to convert the interference light to an electric signal, a processor that calculates a distance from the sensor head to the measurement target based on the electric signal resulting from conversion performed by the light receiver, an identifier that identifies the sensor head based on a beat signal generated by the interferometer, and a setter that sets a measurement condition corresponding to the sensor head identified by the identifier.

16 Claims, 23 Drawing Sheets

(58) Field of Classification Search

CPC ............ G01B 9/02004; G01B 9/02027; G01B 9/02084; G01B 9/0209; G01B 11/026; G01B 9/02069; G01B 2290/70; G01B 9/02007; G01B 2290/45; G01B 9/02091; G01B 9/02002; G01B 9/02018; G01B 9/02083; G01B 9/02021; G01B 9/0207; G01B 9/02019; G01B 2290/60; G01B 11/2441; G01B 9/02061; G01B 9/02059; G01B 9/02075; G01B 9/02081; G01B 9/02044; G01B 2290/15; G01B 9/02043; G01B 9/02068; G01B 9/02045; G01B 9/02057; G01B 9/02067; G01B 9/02072; G01B 2290/30; G01B 9/02014; G01B 11/14; G01B 9/02005; G01B 9/02008; G01B 9/02041; G01B 9/0205; G01B 9/02058; G01B 11/161; G01B 9/02056; G01B 2290/65; G01B 9/02028; G01B 11/26; G01B 11/306; G01B 2290/25; G01B 2290/35; G01B 9/0203; G01B 9/02048; G01B 9/02078; G01B 9/02092; G01B 11/002; G01B 11/02; G01B 11/06; G01B 9/02011; G01B 9/02029; G01B 9/02049; G01B 9/02052; G01B 9/02065; G01B 9/02082; G01B 9/02087; G01B 11/022; G01B 2290/50; G01B 9/02015; G01B 9/02077; G01B 9/02097; G01B 11/18; G01B 11/272; G01B 11/303; G01B 15/00; G01B 21/04; G01B 21/20; G01B 2210/44; G01B 2210/48; G01B 9/02; G01B 9/0201; G01B 9/02016; G01B 9/02022; G01B 9/02038; G01B 9/02042; G01B 9/02051; G01B 9/02063; G01B 9/02096; G01B 11/00; G01B 11/0675; G01B 11/12; G01B 11/24; G01B 11/2433; G01B 11/255; G01B 9/02009; G01B 9/02012; G01B 9/02024; G01B 9/02064; G01B 9/02071; G01B 9/02088; G01B 9/04; G01C 3/08

See application file for complete search history.

(56) References Cited

U.S. PATENT DOCUMENTS

| | | | |
|---|---|---|---|
| 2007/0171425 A1 | 7/2007 | De Groot et al. | |
| 2008/0165347 A1 | 7/2008 | Groot et al. | |
| 2009/0185195 A1* | 7/2009 | Liesener | G01B 9/02027 |
| | | | 356/521 |
| 2010/0053632 A1* | 3/2010 | Alphonse | G01B 9/0209 |
| | | | 356/491 |
| 2010/0091296 A1* | 4/2010 | de Groot | G01B 9/0209 |
| | | | 356/508 |
| 2011/0292403 A1 | 12/2011 | Jensen et al. | |
| 2013/0120757 A1* | 5/2013 | Yu | G01B 9/02091 |
| | | | 356/479 |
| 2021/0285755 A1 | 9/2021 | Kimura et al. | |
| 2021/0396880 A1 | 12/2021 | Yamauchi et al. | |
| 2022/0075076 A1* | 3/2022 | Michaels | G01S 7/497 |

FOREIGN PATENT DOCUMENTS

| | | | |
|---|---|---|---|
| CN | 113390333 A | | 9/2021 |
| JP | 2686124 B2 | | 12/1997 |
| JP | 2012-060408 A | | 3/2012 |
| WO | 2005/024379 A2 | | 3/2005 |
| WO | 2020202547 A1 | | 10/2020 |

OTHER PUBLICATIONS

Office Action (CNOA) issued on Nov. 19, 2025 in a counterpart Chinese patent application No. 202310198621.4.

* cited by examiner

Sensor head 20

Conversion to distance

Peak detection

FIG. 11A                Short-range sensor head
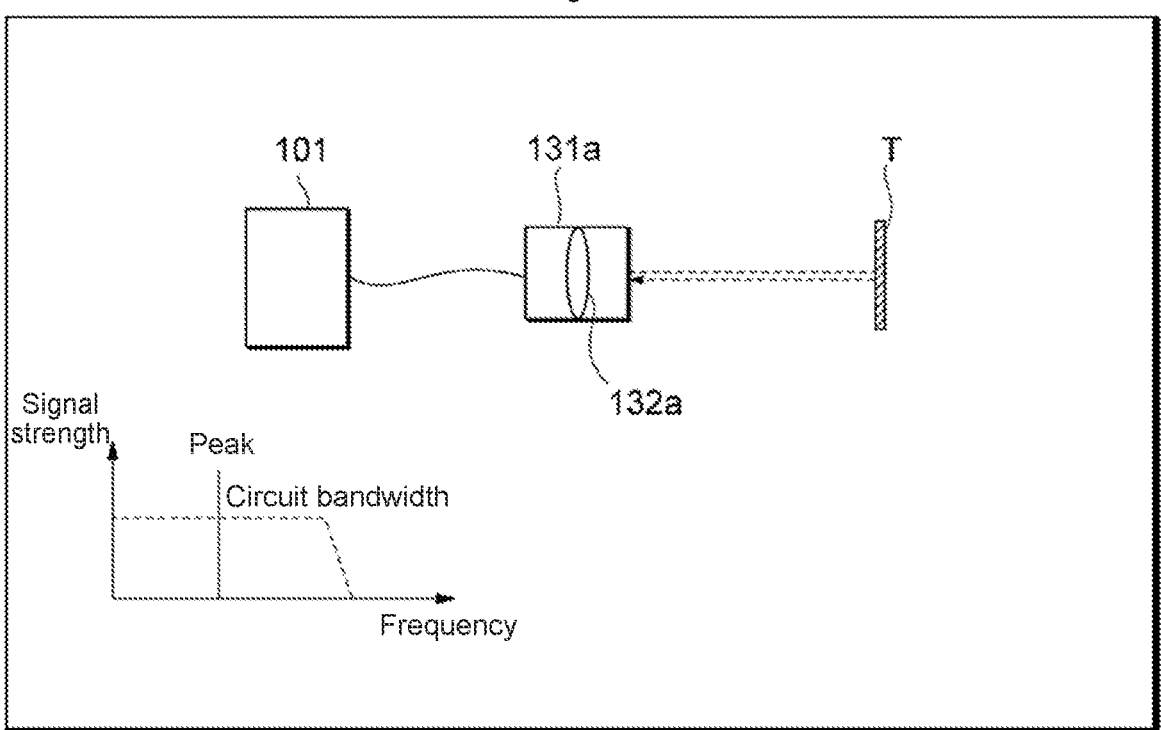
FIG. 11B
Long-range sensor head
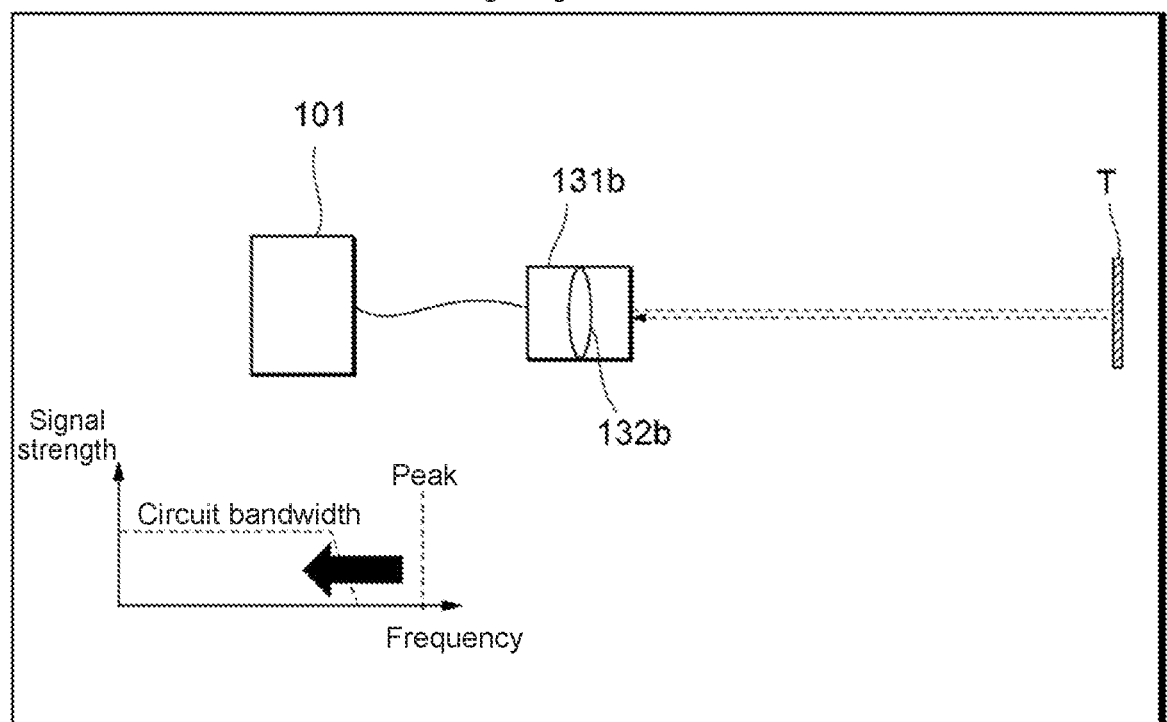

Short-range sensor head

Long-range sensor head

FIG. 13
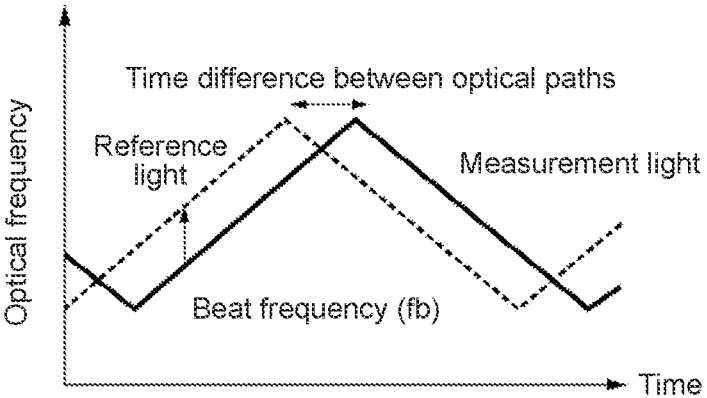
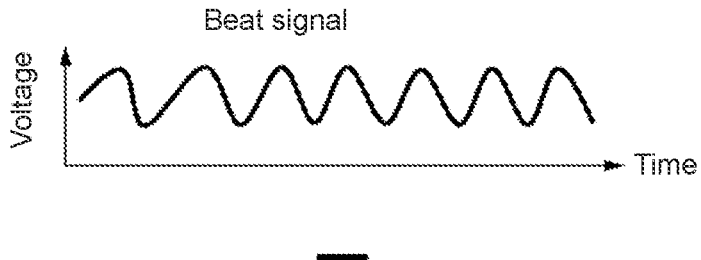
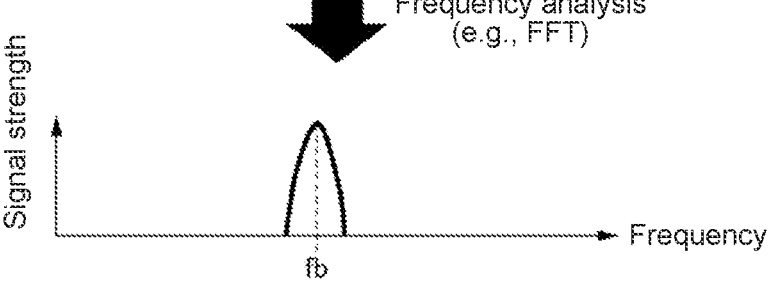

Measurement condition setting method M100

Short-range sensor head

Long-range sensor head

Short-range sensor head

Long-range sensor head

FIG. 18A                    Short-range sensor head
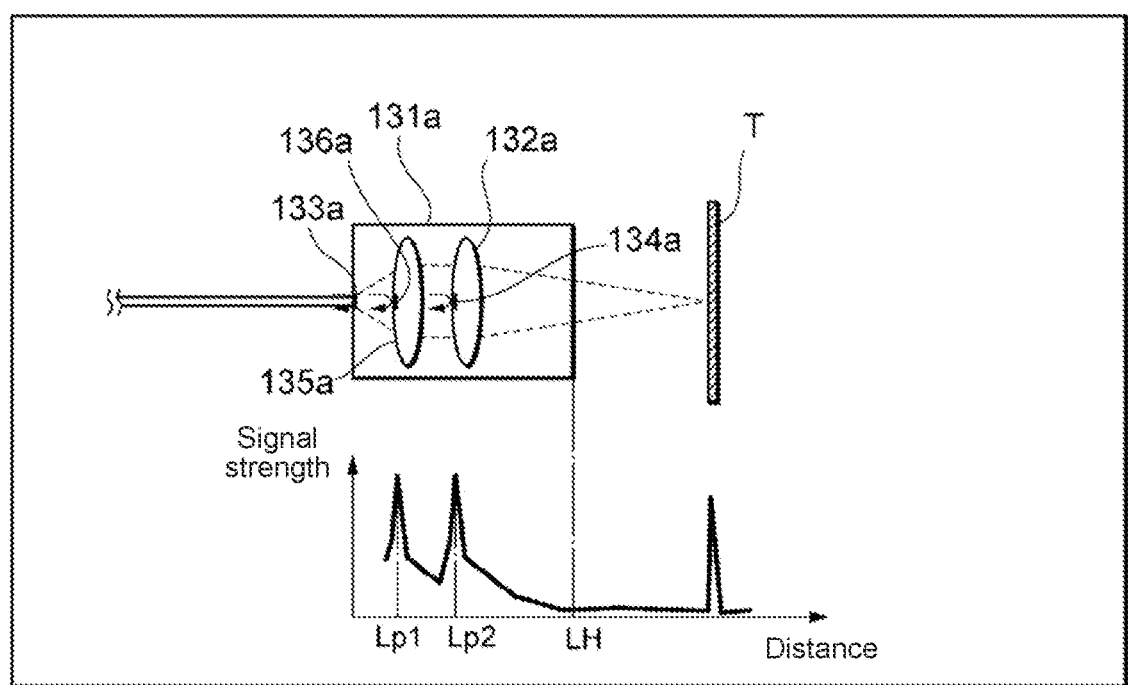
FIG. 18B                    Long-range sensor head
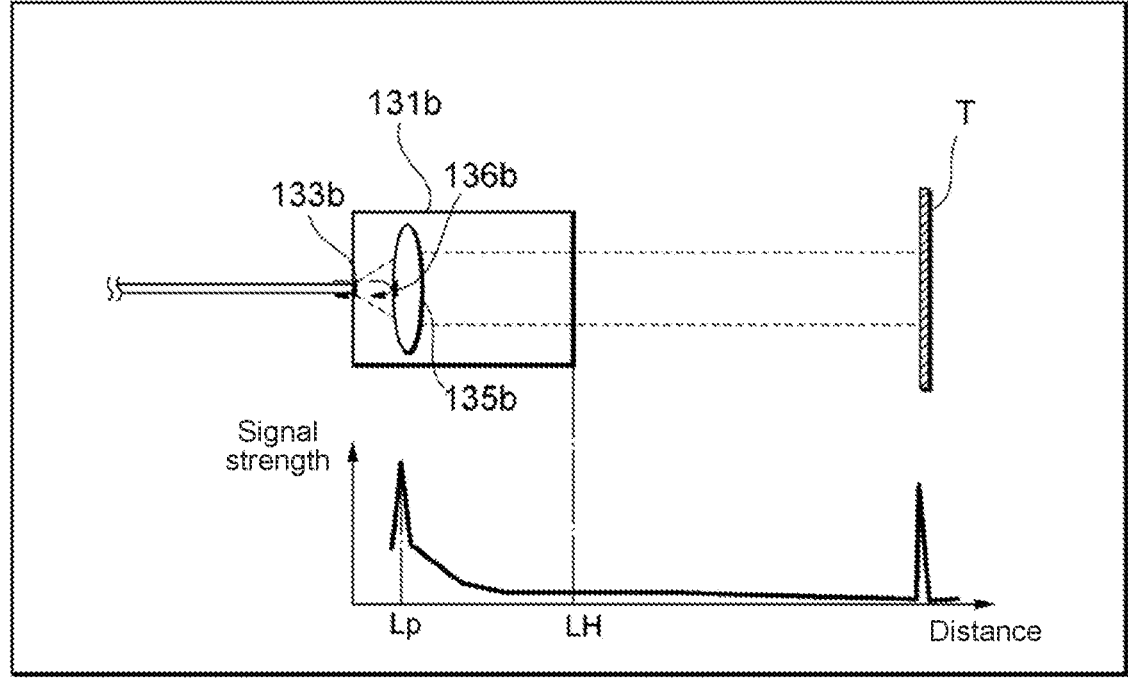

Measurement condition setting method M101

FIG. 20

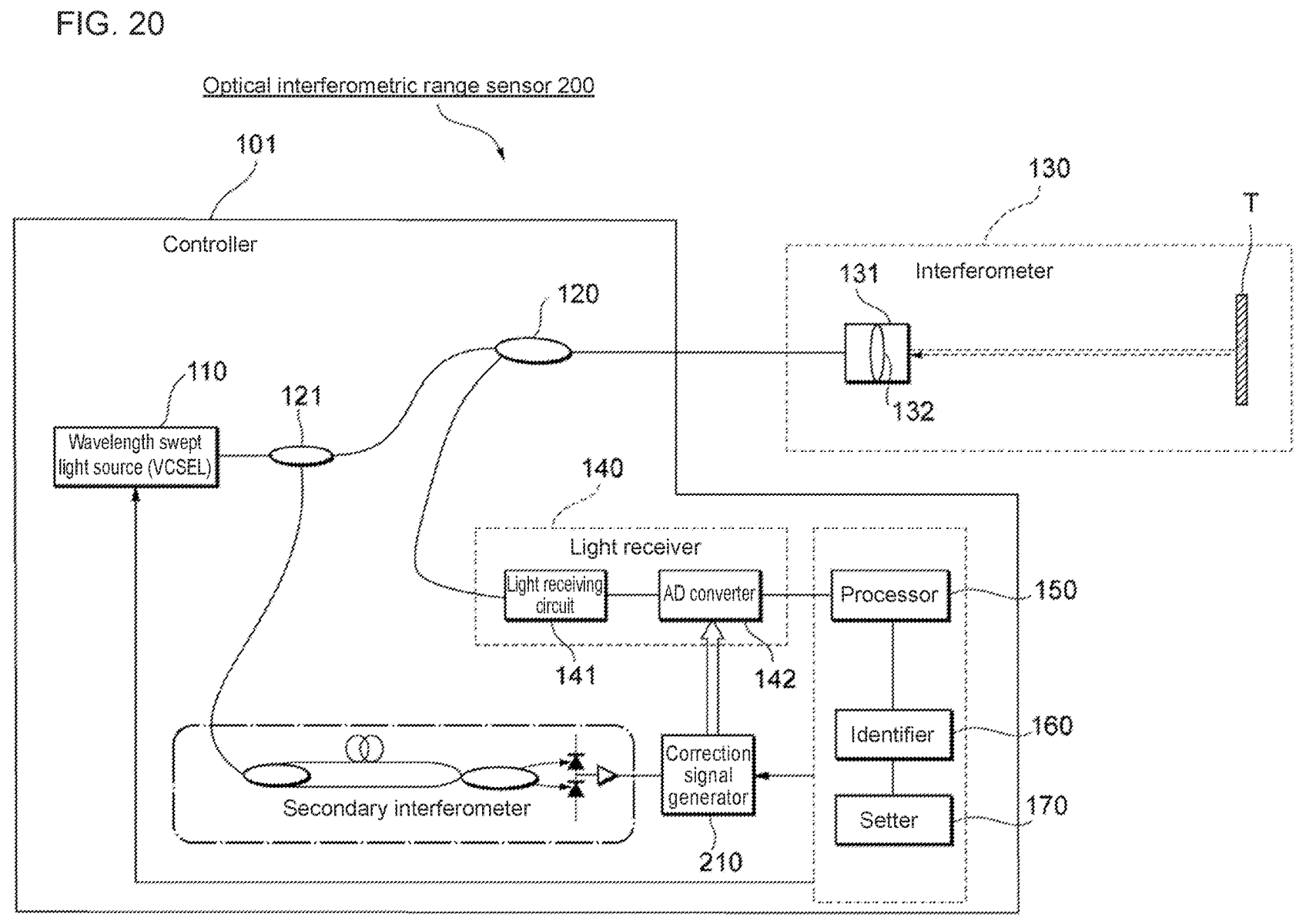

Optical interferometric range sensor 200

Interferometer 130

Controller 101

Wavelength swept light source (VCSEL) 110

Light receiver 140

Light receiving circuit 141

AD converter 142

Correction signal generator 210

Secondary interferometer

Processor 150

Identifier 160

Setter 170

Measurement condition setting method M200

Start

S110
Detect signal peak within area up to LH

S120
Calculate distance (position) Lp corresponding to signal peak

S130
$|Lp - L1| < |Lp - L2|$?

No

S240
Yes
Set sweep rate α1 and frequency multiplication M1

S250
Set sweep rate α2 and frequency multiplication M2

End

OPTICAL INTERFEROMETRIC RANGE SENSOR

CROSS-REFERENCE TO RELATED APPLICATION

This application claims priority to Japanese Patent Application No. 2022-038295 filed on Mar. 11, 2022, the contents of which are incorporated herein by reference.

BACKGROUND

The disclosure relates to an optical interferometric range sensor.

Nowadays, optical range sensors are commonly used to contactlessly measure the distance to a measurement target. For example, a known optical range sensor includes an optical interferometric range sensor that generates, from light emitted from a wavelength swept light source, interference light based on reference light and measurement light and measures the distance to a measurement target based on the interference light.

Patent Literature 1 describes an optical measurement device that causes a returning beam component of a reference beam reflected from the end faces of multiple optical fibers to coherently interfere with a reflected component of a measurement beam reflected from a surface of a measurement target to obtain stable measurement results.

PATENT LITERATURE

Patent Literature 1: Japanese Patent No. 2686124

SUMMARY

For the optical measurement device described in Patent Literature 1, a sensor head and measurement conditions are to be set as appropriate for the measurement distance to a measurement target. For each operation, a sensor head that may cover the measurement distance to the measurement target is to be attached, and measurement conditions are to be set manually as appropriate for the measurement distance to the measurement target.

An optical interferometric range sensor according to one or more embodiments uses a measurement condition appropriate for a measurement distance to a measurement target.

An optical interferometric range sensor according to or more embodiments includes a light source that emits light with a changing wavelength, an interferometer that receives the light emitted from the light source and generates interference light based on measurement light-emitted from a sensor head to a measurement target and reflected from the measurement target- and reference light traveling on an optical path at least partially different from an optical path of the measurement light, a light receiver that receives the interference light from the interferometer to convert the interference light to an electric signal, a processor that is configured to perform operations including calculating a distance from the sensor head to the measurement target based on the electric signal resulting from conversion performed by the light receiver, operation as an identifier that identifies the sensor head based on a beat signal generated by the interferometer, and operation as a setter that sets a measurement condition corresponding to the sensor head identified by the identifier.

The identifier, such as the processor performing operation as the identifier, may identify the sensor head based on the beat signal generated by the interferometer, and the setter sets the measurement condition corresponding to the sensor head identified by the identifier. The structure may allow setting of a measurement condition appropriate for the measurement distance to the measurement target, thus allowing appropriate measurement of the distance to the measurement target. The structure may reduce the user work of, for example, identifying the type of sensor head and manually setting the corresponding measurement conditions in each measurement operation.

The setter, such as the processor performing operation as the setter, may adjust a sweep rate of the light emitted from the light source based on the sensor head identified by the identifier. The sweep rate represents a frequency sweep width per sweep time.

The setter adjusts the sweep rate of the light emitted from the light source based on the sensor head identified by the identifier, thus allowing appropriate detection of a signal peak based on the interference light received by the light receiver in the circuit bandwidth to be processed by the processor.

The optical interferometric range sensor according to one or more embodiments may further include a correction signal generator that generates a correction signal for sampling to convert the interference light received by the light receiver to the electric signal. The setter may adjust a degree by which a frequency of the correction signal is multiplied based on the sensor head identified by the identifier.

The setter adjusts, based on the sensor head identified by the identifier, the degree by which the frequency of the correction signal generated by the correction signal generator is multiplied, thus allowing appropriate sampling of the interference light received by the light receiver. The distance to the measurement target may thus be measured appropriately.

The identifier may identify the sensor head based on at least one of a peak frequency of the beat signal or the number of peaks in the beat signal.

The identifier identifies the sensor head based on at least one of the peak frequency of the beat signal or the number of peaks in the beat signal, thus facilitating identification of the sensor head without causing the user to determine the type of sensor head.

The beat signal may result from a portion of the light emitted from the light source and received by the interferometer being reflected from a component of the interferometer including a reflective surface.

The beat signal results from a portion of the light emitted from the light source and received by the interferometer being reflected from the component of the interferometer including the reflective surface, thus facilitating identification of the sensor head without causing the user to determine the type of sensor head.

The reflective surface may be located inside the sensor head.

The reflective surface may be located inside the sensor head, which may reduce the user work including determination and preparation associated with the sensor head, other than attaching the sensor head, thus facilitating identification of the sensor head.

The reflective surface may be located on an objective lens included in the sensor head.

The reflective surface may be located on the objective lens included in the sensor head, thus eliminating preparation of, for example, a separate component and facilitating identification of the sensor head.

The reflective surface may be located on a collimating lens included in the sensor head.

The reflective surface may be located on the collimating lens included in the sensor head, thus eliminating preparation of, for example, a separate component and facilitating identification of the sensor head.

The reflective surface may be located inside an optical fiber that guides the light emitted from the light source to the sensor head.

The reflective surface may be located inside the optical fiber that guides light emitted from the light source to the sensor head, thus facilitating identification of the sensor head without a reflective surface in the sensor head.

The optical interferometric range sensor according to one or more embodiments may set a measurement condition appropriate for the measurement distance to a measurement target.

BRIEF DESCRIPTION OF THE DRAWINGS

FIG. 11A and FIG. 11B each are diagrams illustrating a relationship between a measurement distance to a measurement target T, a type of sensor head, and a circuit bandwidth in a processor in an example.

FIG. 13 is diagram illustrating aspects of a coherent frequency-modulated continuous-wave (FMCW) signal.

FIGS. 18A and 18B each are schematic diagrams illustrating a sensor head to be identified as a short-range sensor head or a long-range sensor head based on a number of peaks in a beat signal in an example.

FIG. 20 is a schematic diagram illustrating an optical interferometric range sensor according to a second embodiment or embodiments.

DETAILED DESCRIPTION

Figure 1:
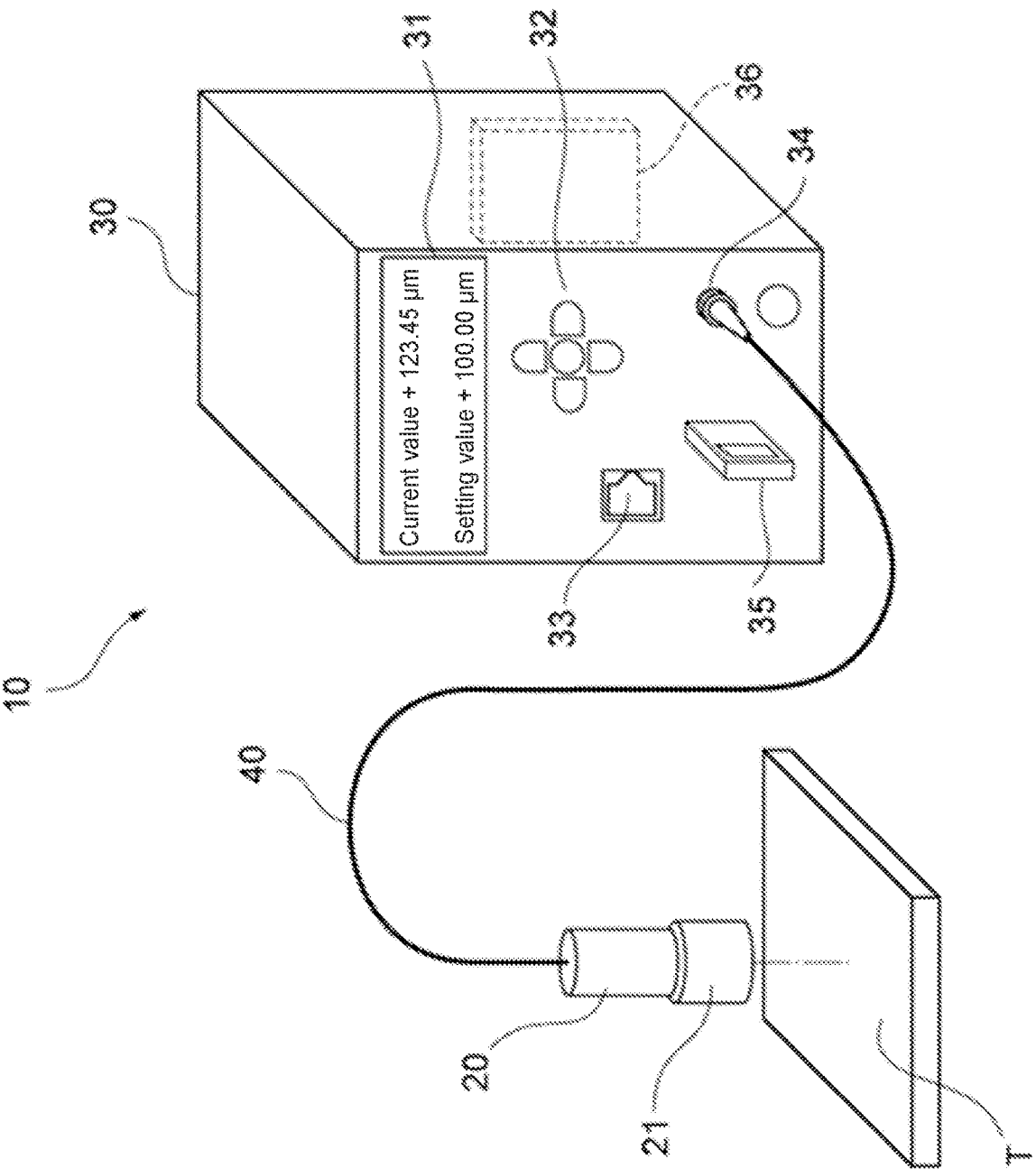
FIG. 1 is a diagram illustrating a schematic external view of a displacement sensor 10 according to one or more embodiments.

One or more embodiments will now be described with specific reference to the accompanying drawings. One or more embodiments described below are merely illustrative implementations and are not to be construed as limiting the scope. To facilitate understanding, the same reference numerals denote the same components in the drawings, and such components will not be described repeatedly.

Overview of Displacement Sensor

An overview of a displacement sensor according to one or more embodiments will be described first. FIG. 1 is a schematic external view of a displacement sensor 10 according to one or more embodiments. As shown in FIG. 1, the displacement sensor 10 includes a sensor head 20 and a controller 30 to measure the displacement of a measurement target T (distance to the measurement target T).

The sensor head 20 and the controller 30 are connected with an optical fiber 40. An objective lens 21 is attached to the sensor head 20. The controller 30 includes a display 31, a setting unit 32, an external interface (I/F) 33, an optical fiber connector 34, an external storage 35, and an internal measurement processor 36.

The sensor head 20 irradiates the measurement target T with light output from the controller 30 and receives reflected light from the measurement target T. The sensor head 20 includes a reference surface inside that reflects light output from the controller 30 and received through the optical fiber 40 and causes such light to interfere with the reflected light from the measurement target T described above.

The objective lens 21 attached to the sensor head 20 is detachable. The objective lens 21 is replaceable with another objective lens having a focal length appropriate for the distance between the sensor head 20 and the measurement target T, or is a variable-focus objective lens.

The sensor head 20, the measurement target T, or both may be positioned to have the measurement target T appropriately being within the measurement area of the displacement sensor 10 by irradiating the measurement target T with guide light (visible light).

The optical fiber 40 is connected to the optical fiber connector 34 on the controller 30 and extends to connect the controller 30 and the sensor head 20. The optical fiber 40 thus guides light emitted from the controller 30 to the sensor head 20 and guides returning light from the sensor head 20 to the controller 30. The optical fiber 40 is detachable from the sensor head 20 and the controller 30. The optical fiber may have any length, thickness, and characteristics.

The display 31 is, for example, a liquid crystal display or an organic electroluminescent (EL) display. The display 31 displays the setting values of the displacement sensor 10, the amount of returning light received from the sensor head 20, and measurement results measured by the displacement sensor 10, such as the displacement of the measurement target T (distance to the measurement target T).

The setting unit 32 receives settings associated with measurement of the measurement target T through user operations performed on mechanical buttons or a touch-screen. All or some of the associated settings may be preset or set through an external connection device (not shown) connected to the external I/F 33. The external connection device may be connected with a wire or wirelessly through a network.

The external I/F 33 includes, for example, Ethernet (registered trademark), Recommended Standard (RS) 232C, and analog output. The external I/F 33 may be connected to an external connection device to allow the associated settings to be input through the external connection device or to output, for example, measurement results measured by the displacement sensor 10 to the external connection device.

The controller 30 may import data stored in the external storage 35 to perform the settings associated with measurement of the measurement target T. The external storage 35 is, for example, an auxiliary storage, such as a universal serial bus (USB) memory, which prestores settings associated with measurement of the measurement target T.

The measurement processor 36 in the controller 30 includes, for example, a wavelength swept light source that emits light with continuously changing wavelengths, a light receiving element that receives returning light from the sensor head 20 to convert the received light to an electric signal, and a signal processing circuit that processes the electric signal. The measurement processor 36 performs various processes, which will be described in detail later, using, for example, a controller and a storage to calculate the displacement of the measurement target T (distance to the measurement target T) based on the returning light from the sensor head 20.

Figure 2:
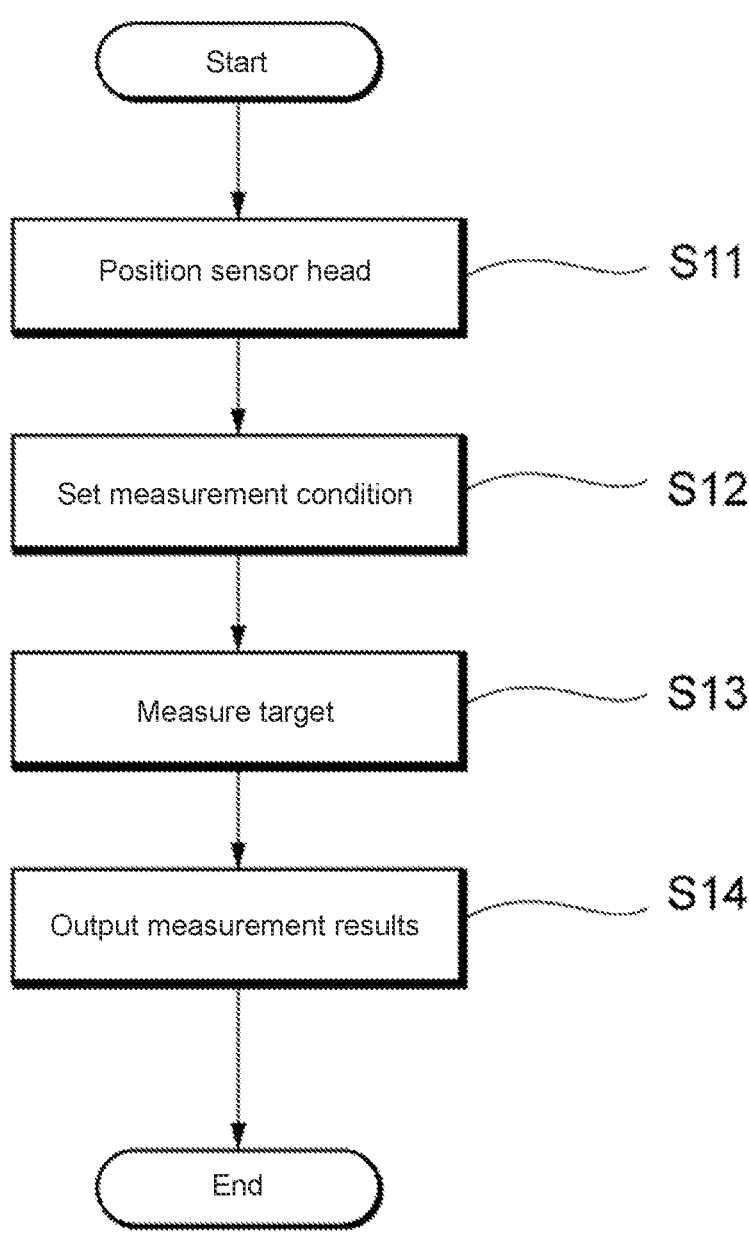
FIG. 2 is a flowchart illustrating measurement of a measurement target T with a displacement sensor according to one or more embodiments.

FIG. 2 is a flowchart showing measurement of the measurement target T with the displacement sensor 10 according to one or more embodiments. As shown in FIG. 2, the procedure includes steps S11 to S14.

In step S11, the sensor head 20 is positioned. For example, the sensor head 20 irradiates the measurement target T with guide light, which is used as a reference to position the sensor head 20 appropriately.

More specifically, the display 31 in the controller 30 may display the amount of returning light from the sensor head 20. The user may refer to the amount of returning light to adjust, for example, the orientation of the sensor head 20 and the distance (position in height) from the measurement target T. Typically, when the sensor head 20 irradiates the measurement target T perpendicularly (at angles closer to 90 degrees), more light is reflected from the measurement target T, and more returning light is received from the sensor head 20.

The objective lens 21 may be replaced with another objective lens having a focal length appropriate for the distance between the sensor head 20 and the measurement target T.

When settings appropriate for measuring the measurement target T are not possible (e.g., the amount of light appropriate for measurement is not received, or the focal length of the objective lens 21 is inappropriate), a message indicating an error or incomplete settings may be displayed on the display 31 or output to the external connection device for the user.

In step S12, various measurement conditions are set to measure the measurement target T. For example, the user sets unique calibration data (e.g., a function to correct linearity) for the sensor head 20 by operating the setting unit 32 in the controller 30.

Various parameters may also be set. For example, the sampling time, the measurement area, and the threshold for determining whether the measurement result is normal or abnormal are set. The measurement cycle may also be set based on the characteristics of the measurement target T such as the reflectance and the material of the measurement target T. The measurement mode may be set based on the material of the measurement target T.

These measurement conditions and various parameters are set by operating the setting unit 32 in the controller 30, but may also be set through an external connection device or by importing data from the external storage 35.

In step S13, the sensor head 20 positioned in step S11 measures the measurement target T in accordance with the measurement conditions and various parameters set in step S12.

More specifically, in the measurement processor 36 included in the controller 30, the wavelength swept light source emits light, the light receiving element receives returning light from the sensor head 20, and the signal processing circuit performs, for example, frequency analysis, distance conversion, and peak detection to calculate the displacement of the measurement target T (distance to the measurement target T). The measurement will be specifically described in detail later.

In step S14, the results of the measurement performed in step S13 are output. For example, the displacement of the measurement target T (distance to the measurement target T) measured in step S13 and other information are displayed on the display 31 in the controller 30 or output to the external connection device.

The measurement result displayed or output may also include whether the displacement of the measurement target T (distance to the measurement target T) measured in step S13 is within a normal range or is abnormal based on the threshold set in step S12. The measurement conditions, the parameters, and the measurement mode set in step S12 may also be displayed or output together.

Overview of System Including Displacement Sensor

Figure 3:
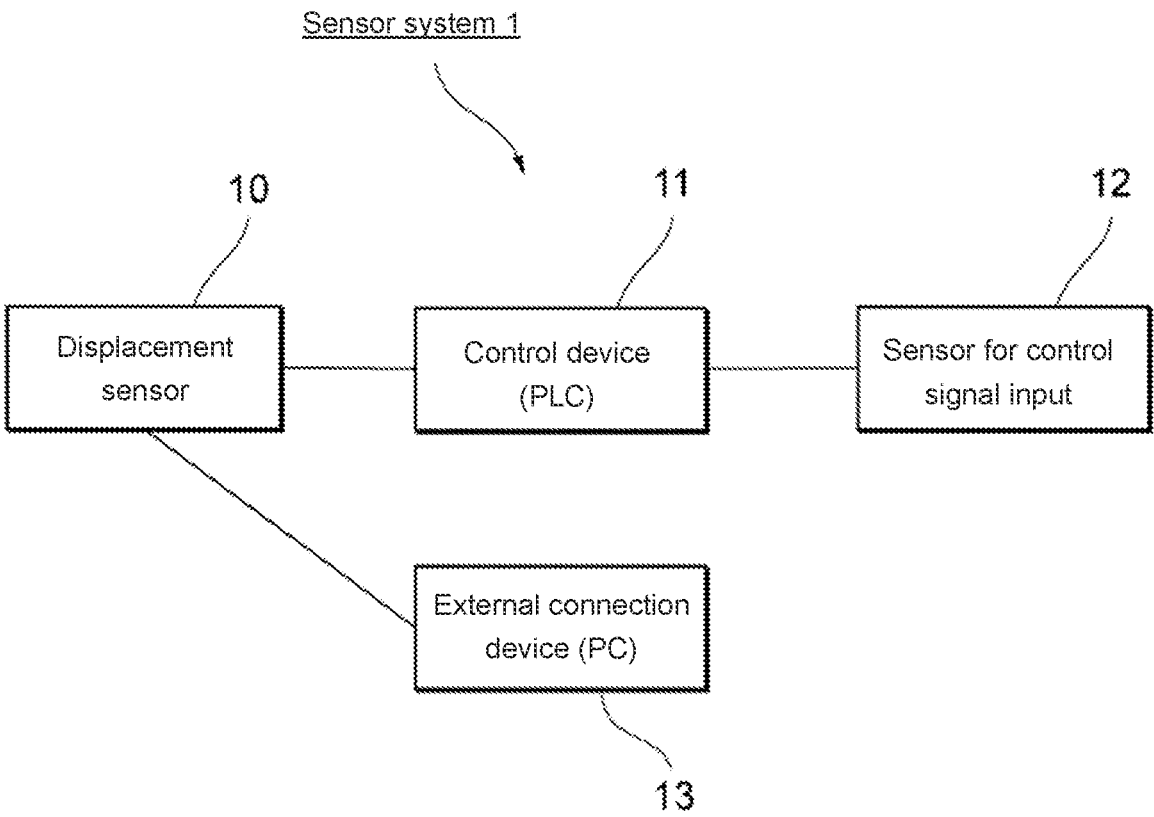
FIG. 3 is a functional block diagram illustrating a sensor system 1 including a displacement sensor according to one or more embodiments.

FIG. 3 is a functional block diagram of a sensor system 1 including the displacement sensor 10 according to one or more embodiments. As shown in FIG. 3, the sensor system 1 includes the displacement sensor 10, a control device 11, a sensor 12 for control signal input, and an external connection device 13. The displacement sensor 10 is connected to the control device 11 and the external connection device 13 with, for example, a communication cable or an external connection cord (e.g., an external input line, an external output line, or a power line). The control device 11 and the sensor 12 for control signal input are connected with a signal line.

The displacement sensor 10 measures the displacement of the measurement target T (distance to the measurement target T) as described with reference to FIGS. 1 and 2. The displacement sensor 10 may then output the measurement results and other information to the control device 11 and the external connection device 13.

The control device 11 is, for example, a programmable logic controller (PLC), which provides various instructions to the displacement sensor 10 measuring the measurement target T.

For example, the control device 11 may output a measurement time signal to the displacement sensor 10 based on an input signal from the sensor 12 for control signal input connected to the control device 11 or may output, for example, a zero reset command signal (a signal to set the current measurement value to zero) to the displacement sensor 10.

The sensor 12 for control signal input outputs an on-signal or an off-signal to the control device 11 to indicate the time for the displacement sensor 10 to measure the measurement target T. For example, the sensor 12 for control signal input is installed near the production line carrying the measurement target T to output the on- or off-signal to the control device 11 upon detecting the measurement target T moved to a predetermined position.

The external connection device 13 is, for example, a personal computer (PC), which is operable by the user to perform various settings with the displacement sensor 10.

In an example, a measurement mode, an operation mode, a measurement cycle, and the material of the measurement target T are set.

The measurement mode is selectively set to, for example, an internal synchronous measurement mode in which measurement starts periodically in the control device 11 or to an external synchronous measurement mode in which measurement starts in response to an input signal from outside the control device 11.

The operation mode is selectively set to, for example, an in-operation mode in which the measurement target T is actually measured or to an adjustment mode in which the measurement conditions are set for measuring the measurement target T.

The measurement cycle for measuring the measurement target T is set based on the reflectance of the measurement target T. For any measurement target T with low reflectance, a longer measurement cycle may be set as appropriate to allow appropriate measurement of the measurement target T.

For example, a rough surface mode is selected for a measurement target T reflecting light containing a relatively large amount of diffuse reflection component. A specular surface mode is selected for a measurement target T reflect-ing light containing a relatively large amount of specular reflection component. A standard mode is selected for a measurement target T reflecting light containing about a half diffuse reflection component and a half specular reflection component.

Appropriate mode setting based on the reflectance and the material of the measurement target T allows more accurate measurement of the measurement target T.

Figure 4:
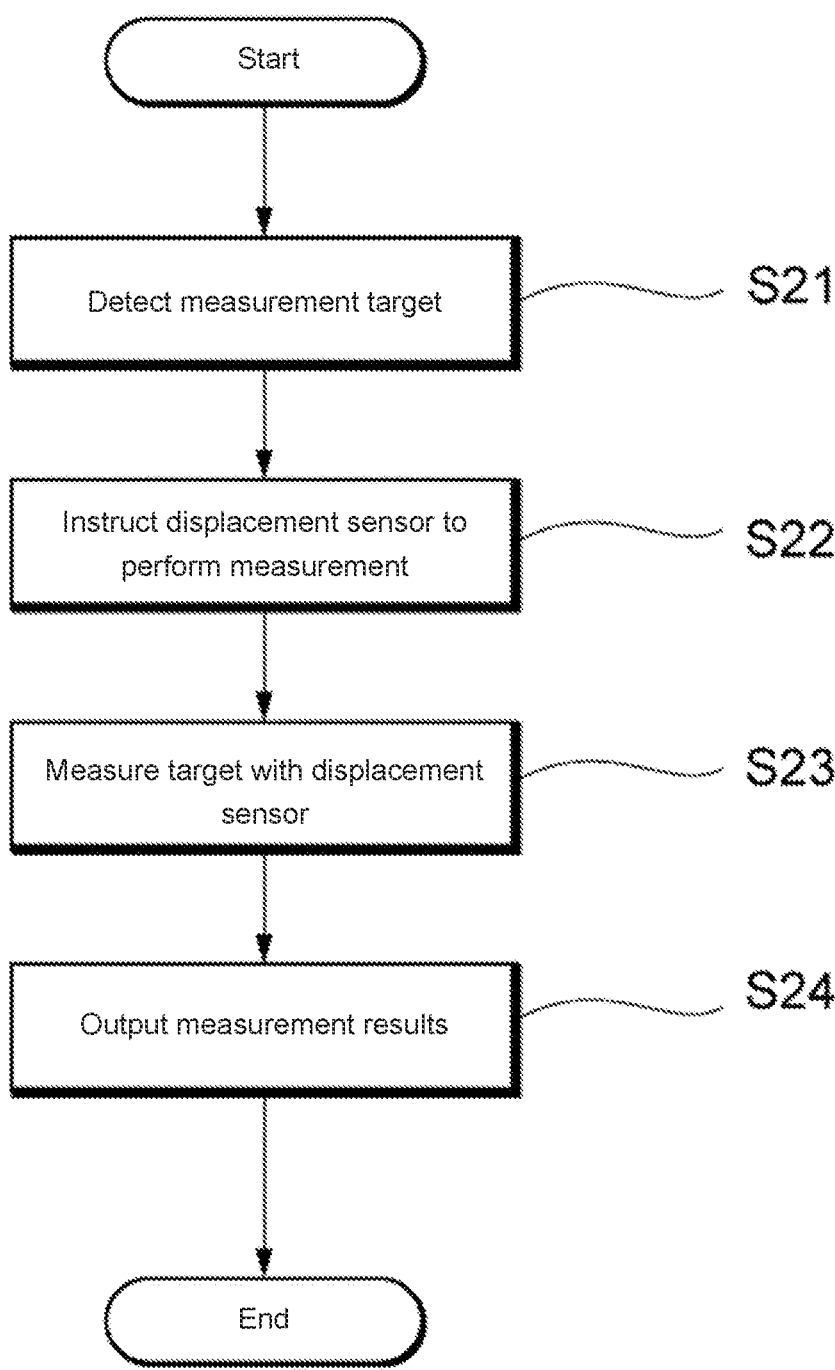
FIG. 4 is a flowchart illustrating measurement of a measurement target T with a sensor system including a displacement sensor according to one or more embodiments.

FIG. 4 is a flowchart showing measurement of the measurement target T with the sensor system 1 including the displacement sensor 10 according to one or more embodiments. As shown in FIG. 4, the procedure is performed in the external synchronous measurement mode and includes steps S21 to S24.

In step S21, the sensor system 1 detects a measurement target T, which is an object to be measured. More specifically, the sensor 12 for control signal input detects the measurement target T moved to a predetermined position on the production line.

In step S22, the sensor system 1 instructs the displacement sensor 10 to measure the measurement target T detected in step S21. More specifically, the sensor 12 for control signal input outputs an on-signal or an off-signal to the control device 11 to indicate the time to measure the measurement target T detected in step S21. The control device 11 outputs a measurement time signal to the displacement sensor 10 in response to the on- or off-signal to instruct the displacement sensor 10 to measure the measurement target T.

In step S23, the displacement sensor 10 measures the measurement target T. More specifically, the displacement sensor 10 measures the measurement target T in response to the measurement instruction received in step S22.

In step S24, the sensor system 1 outputs measurement results obtained in step S23. More specifically, the displacement sensor 10 causes the display 31 to display the measurement results or outputs the results to, for example, the control device 11 or the external connection device 13 through the external I/F 33.

Although the procedure described above with reference to FIG. 4 is performed in the external synchronous measurement mode in which the measurement target T is measured in response to the sensor 12 for control signal input detecting the measurement target T, the measurement may be performed with a procedure in any mode. For example, in the internal synchronous measurement mode, the processing in steps S21 and S22 may be replaced with generation of a measurement time signal in preset cycles to instruct the displacement sensor 10 to measure the measurement target T.

Figure 5A:
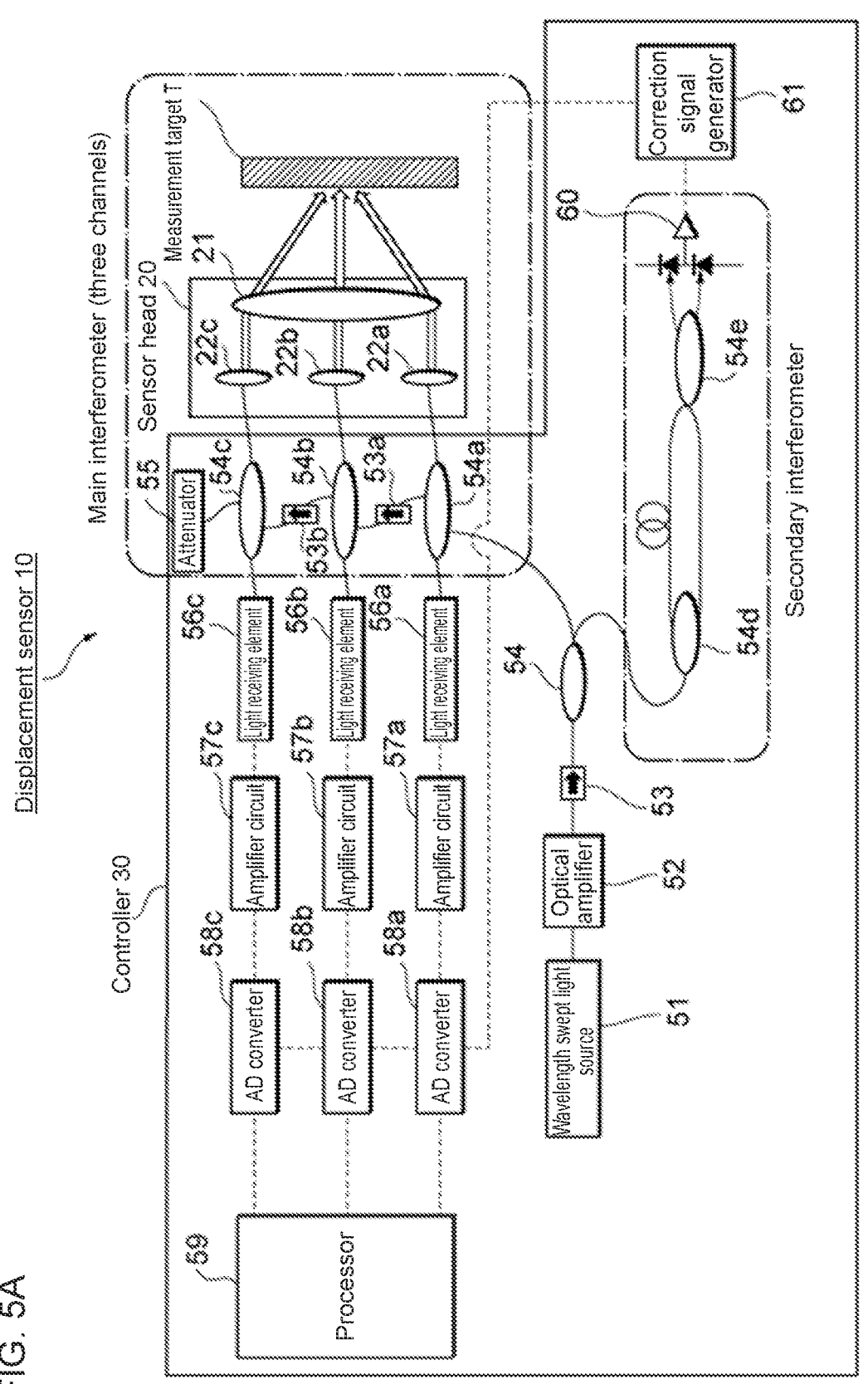
FIG. 5A is a diagram illustrating a basic measurement procedure of a measurement target T with a displacement sensor according to one or more embodiments.

A basic measurement procedure of the measurement target T with the displacement sensor 10 according to one or more embodiments will now be described. FIG. 5A is a diagram describing a basic measurement procedure of the measurement target T with the displacement sensor 10 according to one or more embodiments. As shown in FIG. 5A, the displacement sensor 10 includes the sensor head 20 and the controller 30. The sensor head 20 includes the objective lens 21 and multiple collimating lenses 22a to 22c. The controller 30 includes a wavelength swept light source 51, an optical amplifier 52, multiple isolators 53, 53a, and 53b, multiple optical couplers 54 and 54a to 54e, an attenu-ator 55, multiple light receiving elements (e.g., photodetec-tors, or PDs) 56a to 56c, multiple amplifier circuits 57a to 57c, multiple analog-to-digital (AD) converters 58a to 58c, a processor 59, a balance detector 60, and a correction signal generator 61.

The wavelength swept light source 51 emits a laser beam with a swept wavelength. The wavelength swept light source 51 may be, for example, a vertical-cavity surface-emitting laser (VCSEL) modulated with an electric current. Such a wavelength swept light source 51 with a short cavity length is less likely to cause mode hopping and facilitates wavelength changes at low cost.

The optical amplifier 52 amplifies light emitted from the wavelength swept light source 51. The optical amplifier 52 may be, for example, an erbium-doped fiber amplifier (EDFA) for light with 1550 nm.

The isolator 53 is an optical element that transmits incident light in one direction. The isolator 53 may be located immediately downstream from the wavelength swept light source 51 to reduce returning light affecting the measurement as noise.

Light emitted from the wavelength swept light source 51 is amplified by the optical amplifier 52, travels through the isolator 53, and is split by the optical coupler 54 and incident on a main interferometer and a secondary interferometer. For example, the optical coupler 54 may split the light to be incident on the main interferometer and the secondary interferometer at a ratio of 90:10 to 99:1.

The light split and incident on the main interferometer is further split by the first-stage optical coupler 54a into light toward the sensor head 20 and light toward the second-stage optical coupler 54b.

The light split toward the sensor head 20 by the first-stage optical coupler 54a travels across the sensor head 20 from the end of the optical fiber through the collimating lens 22a and the objective lens 21 to the measurement target T. The end (end face) of the optical fiber serves as the reference surface. The light reflected from the reference surface and the light reflected from the measurement target T interfere with each other to form interference light, which returns to the first-stage optical coupler 54a and is received by the light receiving element 56a for conversion to an electric signal.

The light split by the first-stage optical coupler 54a toward the second-stage optical coupler 54b enters the second-stage optical coupler 54b through the isolator 53a, and is further split by the second-stage optical coupler 54b into light toward the sensor head 20 and light toward the third-stage optical coupler 54c. The light directed by the optical coupler 54b to the sensor head 20 travels across the sensor head 20 from the end of the optical fiber through the collimating lens 22b and the objective lens 21 to the measurement target T in the same manner as in the first stage. The end (end face) of the optical fiber serves as the reference surface. The light reflected from the reference surface and the light reflected from the measurement target T interfere with each other to form interference light, which returns to the second-stage optical coupler 54b and is split by the optical coupler 54b into light toward the isolator 53a and light toward the light receiving element 56b. The light directed by the optical coupler 54b to the light receiving element 56b is received by the light receiving element 56b and converted to an electric signal. The isolator 53a transmits light from the optical coupler 54a in the preceding stage to the optical coupler 54b in the subsequent stage, but blocks light from the optical coupler 54b in the subsequent stage to the optical coupler 54a in the preceding stage. The light directed by the optical coupler 54b to the isolator 53a is thus blocked.

The light split toward the third-stage optical coupler 54c by the second-stage optical coupler 54b enters the third-stage optical coupler 54c through the isolator 53b, and is further split by the third-stage optical coupler 54c into light toward the sensor head 20 and light toward the attenuator 55. The light directed by the optical coupler 54c to the sensor head 20 travels across the sensor head 20 from the end of the optical fiber through the collimating lens 22c and the objective lens 21 to the measurement target T in the same manner as in the first and second stages. The end (end face) of the optical fiber serves as the reference surface. The light reflected from the reference surface and the light reflected from the measurement target T interfere with each other to form interference light, which returns to the third-stage optical coupler 54c and is split by the optical coupler 54c into light toward the isolator 53b and light toward the light receiving element 56c. The light directed by the optical coupler 54c to the light receiving element 56c is received by the light receiving element 56c and converted to an electric signal. The isolator 53b transmits light from the optical coupler 54b in the preceding stage to the optical coupler 54c in the subsequent stage, but blocks light from the optical coupler 54c in the subsequent stage to the optical coupler 54b in the preceding stage. The light directed by the optical coupler 54c to the isolator 53b is thus blocked.

The light directed by the third-stage optical coupler 54c in the direction other than to the sensor head 20 is not used in the measurement of the measurement target T. Such light may thus be attenuated by the attenuator 55 such as a terminator to avoid returning back by reflection.

As described above, the main interferometer includes three stages of optical paths (three channels) each with an optical path length difference being twice (round trip) the distance from the end (end face) of the optical fiber connected to the sensor head 20 to the measurement target T, thus generating three beams of interference light corresponding to the respective optical path length differences.

The light receiving elements 56a to 56c receive interference light from the main interferometer as described above and generate electric signals corresponding to the amounts of received light.

The amplifier circuits 57a to 57c amplify the electric signals output from the respective light receiving elements 56a to 56c.

The AD converters 58a to 58c receive the electric signals amplified by the respective amplifier circuits 57a to 57c and convert the electric signals from analog signals to digital signals (AD conversion). The AD converters 58a to 58c perform AD conversion based on a correction signal from the correction signal generator 61 in the secondary interferometer.

The secondary interferometer obtains an interference signal in the secondary interferometer and generates the correction signal, referred to as a K clock, to correct nonlinearity in the swept wavelength of the wavelength swept light source 51.

More specifically, the light split by the optical coupler 54 and incident on the secondary interferometer is further split by the optical coupler 54d. The optical paths for the resultant light beams may have different lengths with the use of, for example, optical fibers having different lengths extending between the optical coupler 54d and the optical coupler 54e, thus outputting interference light corresponding to the optical path length difference from the optical coupler 54e. The balance detector 60 receives the interference light from the optical coupler 54e and amplifies the optical signal while removing noise as the difference from the signal having a phase inverted from the phase of the interference light to convert the optical signal to an electric signal.

Each of the optical coupler 54d and the optical coupler 54e may split the light at a ratio of 50:50.

The correction signal generator 61 determines, based on the electric signal from the balance detector 60, the nonlinearity in the swept wavelength of the wavelength swept light source 51 and generates a K clock corresponding to the nonlinearity for output to the AD converters 58a to 58c.

The nonlinearity in the swept wavelength of the wavelength swept light source 51 indicates that the waves of the analog signals input into the AD converters 58a to 58c in the main interferometer occur at unequal intervals. The AD converters 58a to 58c perform AD conversion (sampling) by correcting the sampling time based on the K clock described above to cause the waves at equal intervals.

As described above, the K clock is a correction signal for sampling the analog signal in the main interferometer. The K clock is thus to be generated to have a higher frequency than the analog signal in the main interferometer. More specifically, the length difference between the optical paths extending between the optical coupler 54d and the optical coupler 54e in the secondary interferometer may be designed longer than the optical path length difference corresponding to the distance between the end (end face) of the optical fiber and the measurement target T in the main interferometer, or the frequency of the K clock may be multiplied (e.g., by eight times) to a higher frequency by the correction signal generator 61.

The processor 59 obtains digital signals converted from analog signals by the AD converter 58a to 58c with the nonlinearity being corrected, and calculates the displacement of the measurement target T (distance to the measurement target T) based on the digital signals. More specifically, the processor 59 converts the digital signals to a frequency spectrum using a fast Fourier transform (FFT) and analyzes the resultant frequencies to calculate the distance. The processing performed by the processor 59 will be described in detail later.

The processor 59, which is to perform high speed processing, is often implemented with an integrated circuit such as a field-programmable gate array (FPGA).

In the present embodiment, the main interferometer includes three stages of optical paths (multiple channels), with the sensor head 20 emitting measurement light along the light paths to the measurement target T. The interference light (returning light) obtained through each light path is used to measure, for example, the distance to the measurement target T. The main interferometer may include any number of channels other than three channels, such as one, two, or four or more channels.

Figure 5B:
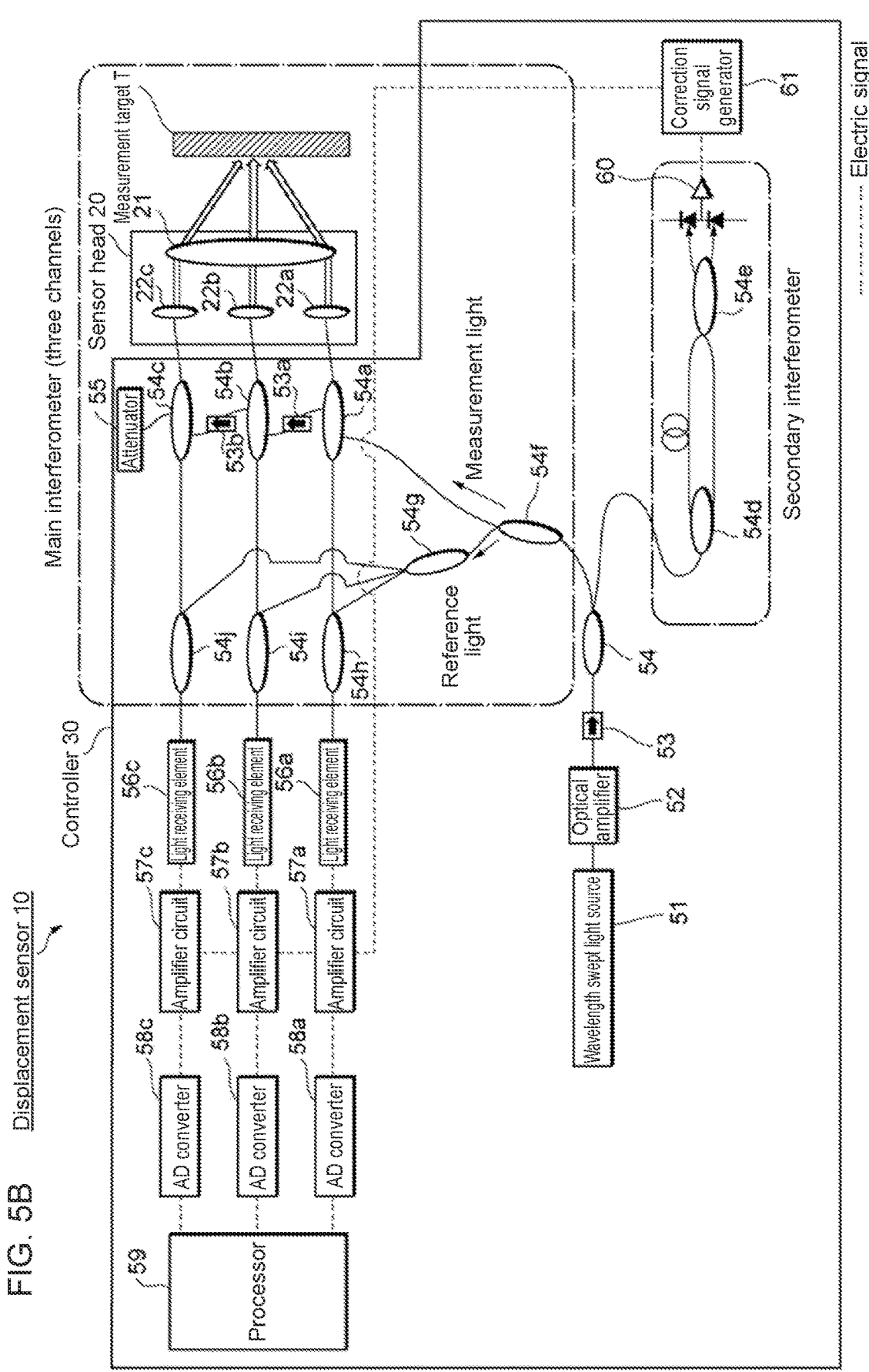
FIG. 5B is a diagram illustrating another basic measurement procedure of a measurement target T with a displacement sensor according to one or more embodiments.

FIG. 5B is a diagram describing another basic measurement procedure of the measurement target T with the displacement sensor 10 according to one or more embodiments. As shown in FIG. 5B, the displacement sensor 10 includes the sensor head 20 and the controller 30. The sensor head 20 includes the objective lens 21 and the multiple collimating lenses 22a to 22c. The controller 30 includes the wavelength swept light source 51, the optical amplifier 52, the multiple isolators 53, 53a, and 53b, multiple optical couplers 54 and 54a to 54j, the attenuator 55, the multiple light receiving elements (e.g., PDs) 56a to 56c, the multiple amplifier circuits 57a to 57c, the multiple AD converters 58a to 58c, the processor 59, the balance detector 60, and the correction signal generator 61. The displacement sensor 10 shown in FIG. 5B differs from the displacement sensor 10 shown in FIG. 5A mainly in including the optical couplers 54f to 54j. The basic procedure of the structure will be described in detail by focusing on its differences from the structure shown in FIG. 5A.

Light emitted from the wavelength swept light source 51 is amplified by the optical amplifier 52, travels through the isolator 53, and is split by the optical coupler 54 into light toward the main interferometer and light toward the secondary interferometer. The light split toward the main interferometer is further split by the optical coupler 54f to serve as measurement light and reference light.

As described with reference to FIG. 5A, the measurement light is directed by the first-stage optical coupler 54a to travel through the collimating lens 22a and the objective lens 21 to the measurement target T and is reflected from the measurement target T. In the structure in FIG. 5A, the light reflected from the end (end face) of the optical fiber serving as the reference surface and the light reflected from the measurement target T interfere with each other to form interference light. In the structure in FIG. 5B, the reference surface to reflect light is eliminated. In other words, in the structure in FIG. 5B, no light is reflected from the reference surface unlike in FIG. 5A, and thus the measurement light reflected from the measurement target T returns to the first-stage optical coupler 54a.

Similarly, the light directed by the first-stage optical coupler 54a to the second-stage optical coupler 54b enters the second-stage optical coupler 54b, which directs a portion of light to travel through the collimating lens 22b and the objective lens 21 to the measurement target T. The light is then reflected from the measurement target T to return to the second-stage optical coupler 54b. The light directed by the second-stage optical coupler 54b to the third-stage optical coupler 54c enters the third-stage optical coupler 54c, which directs a portion of the light to travel through the collimating lens 22c and the objective lens 21 to the measurement target T. The light is then reflected from the measurement target T to return to the third-stage optical coupler 54c.

The reference light resulting from the split performed by the optical coupler 54f is further split by the optical coupler 54g to be incident on the optical couplers 54h, 54i, and 54j.

In the optical coupler 54h, the measurement light reflected from the measurement target T and output from the optical coupler 54a and the reference light output from the optical coupler 54g interfere with each other to form interference light, which is received by the light receiving element 56a and converted to an electric signal. In other words, the light split by the optical coupler 54f to serve as the measurement light and the reference light forms interference light corresponding to the length difference between the optical path for the measurement light (from the optical coupler 54f through the optical coupler 54a, the collimating lens 22a, and the objective lens 21 to the measurement target T and back to the optical coupler 54h) and the optical path for the reference light (from the optical coupler 54f through the optical coupler 54g to the optical coupler 54h). The interference light is received by the light receiving element 56a and converted to an electric signal.

Similarly, in the optical coupler 54i, interference light is formed to correspond to the length difference between the optical path for the measurement light (from the optical coupler 54f through the optical couplers 54a and 54b, the collimating lens 22b, and the objective lens 21 to the measurement target T and back to the optical coupler 54i) and the optical path for the reference light (from the optical coupler 54f through the optical coupler 54g to the optical coupler 54i). The interference light is received by the light receiving element 56b and converted to an electric signal.

In the optical coupler 54j, interference light is formed to correspond to the length difference between the optical path for the measurement light (from the optical coupler 54f through the optical couplers 54*a*, 54*b*, and 54*c*, the collimating lens 22*c*, and the objective lens 21 to the measurement target T, and back to the optical coupler 54*j*) and the optical path for the reference light (from the optical coupler 54*f* through the optical coupler 54*g* to the optical coupler 54*j*). The interference light is received by the light receiving element 56*c* and converted to an electric signal. The light receiving elements 56*a* to 56*c* may be, for example, balance PDs.

As described above, the main interferometer includes three stages of optical paths (three channels) to generate three beams of interference light each corresponding to the length difference between the optical path for the measurement light reflected from the measurement target T and input into the optical coupler 54*h*, 54*i*, or 54*j* and the optical path for the reference light input through the optical couplers 54*f* and 54*g* into the optical coupler 54*h*, 54*i*, or 54*j*.

The length difference between the optical path for the measurement light and the optical path for the reference light may be set to differ in each of the three channels with, for example, the optical path length differing between the optical coupler 54*g* and each of the optical couplers 54*h*, 54*i*, and 54*j*.

The interference light obtained through each of the optical paths (multiple channels) is used to measure, for example, the distance to the measurement target T.

Sensor Head Structure

Figure 6A:
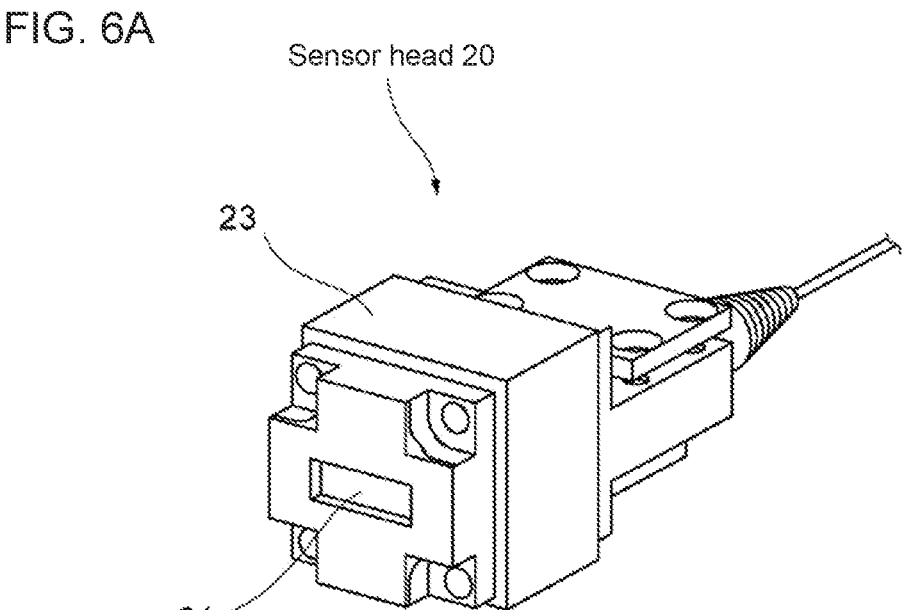
FIG. 6A is a diagram illustrating a schematic perspective view of a sensor head.
Figure 6B:
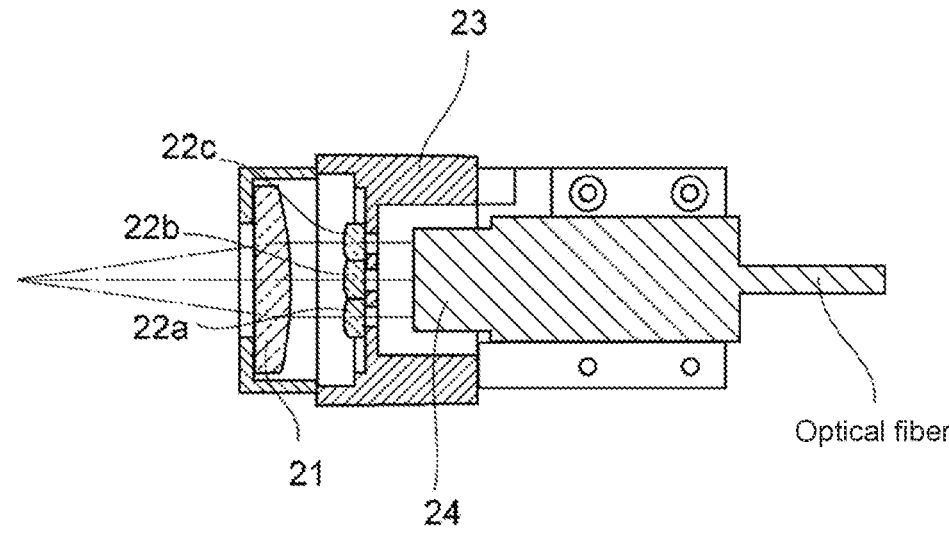
FIG. 6B is a diagram illustrating a schematic view of a sensor head showing an internal structure.

The structure of the sensor head used in the displacement sensor 10 will now be described. FIG. 6A is a schematic perspective view of the sensor head 20. FIG. 6B is a schematic view of the sensor head showing the internal structure.

As shown in FIG. 6A, the sensor head 20 includes a lens holder 23 holding the objective lens 21 and collimating lenses. For example, the size of the lens holder 23 is about 20 mm on one side surrounding the objective lens 21 and about 40 mm in length in the optical axis direction.

As shown in FIG. 6B, the lens holder 23 holds one objective lens 21 and three collimating lenses 22*a* to 22*c*. Light from the optical fiber is guided through an optical fiber array 24 to the three collimating lenses 22*a* to 22*c*. The light through the three collimating lenses 22*a* to 22*c* reaches the measurement target T through the objective lens 21.

The optical fiber, the collimating lenses 22*a* to 22*c*, and the optical fiber array 24 are held by the lens holder 23 together with the objective lens 21, thus together serving as the sensor head 20.

The lens holder 23 in the sensor head 20 may be formed from a metal (e.g., A2017), which has high strength and is machinable with high precision.

Figure 7:
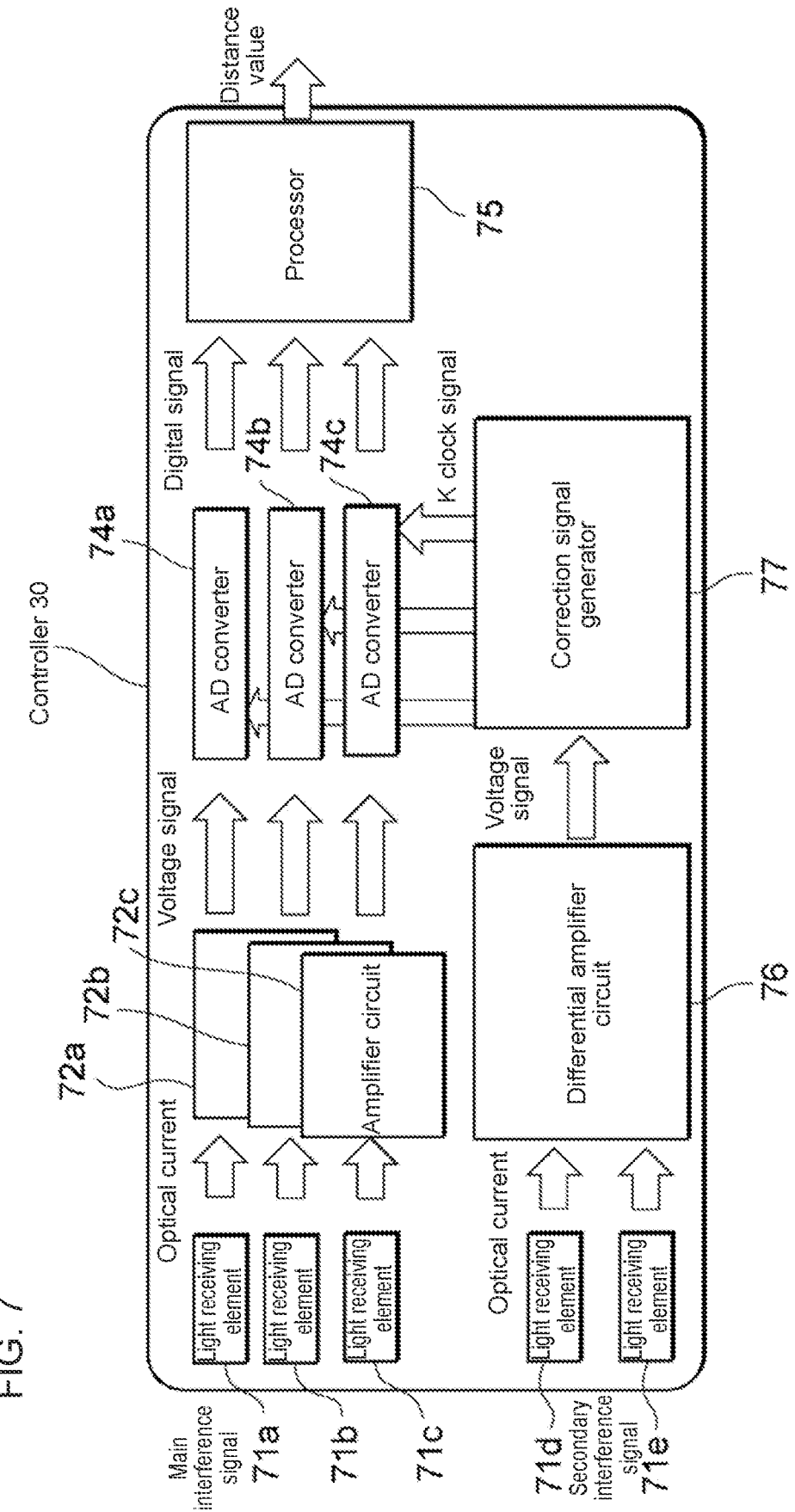
FIG. 7 is a block diagram illustrating elements for performing signal processing in a controller.

FIG. 7 is a block diagram showing signal processing elements in the controller 30. As shown in FIG. 7, the controller 30 includes multiple light receiving elements 71*a* to 71*e*, multiple amplifier circuits 72*a* to 72*c*, multiple AD converters 74*a* to 74*c*, a processor 75, a differential amplifier circuit 76, and a correction signal generator 77.

As shown in FIG. 5A, the controller 30 splits, with the optical coupler 54, light emitted from the wavelength swept light source 51 into light to be incident on the main interferometer and light to be incident on the secondary interferometer and processes a main interference signal obtained from the main interferometer and a secondary interference signal obtained from the secondary interferometer to calculate a distance value to the measurement target T.

The multiple light receiving elements 71*a* to 71*c* correspond to the light receiving elements 56*a* to 56*c* shown in FIG. 5A. The light receiving elements 71*a* to 71*c* receive main interference signals from the main interferometer to output the signals to the respective amplifier circuits 72*a* to 72*c* as current signals.

The amplifier circuits 72*a* to 72*c* convert the current signals to voltage signals (I-V conversion) and amplify the resultant signals.

The AD converters 74*a* to 74*c* correspond to the AD converters 58*a* to 58*c* shown in FIG. 5A. The AD converters 74*a* to 74*c* convert the voltage signals to digital signals (AD conversion) based on the K clock from the correction signal generator 77 (described later).

The processor 75 may correspond to the processor 59 shown in FIG. 5A. The processor 75 converts the digital signals from the AD converters 74*a* to 74*c* to a frequency spectrum using an FFT and analyzes the frequencies to calculate the distance value to the measurement target T.

The light receiving elements 71*d* and 71*e* and the differential amplifier circuit 76 correspond to the balance detector 60 shown in FIG. 5A. The light receiving elements 71*d* and 71*e* each receive interference light from the secondary interferometer. One of the light receiving elements 71*d* and 71*e* outputs an interference signal with the phase being inverted. The differential amplifier circuit 76 amplifies the interference light while removing noise as the difference between the two signals and converts the signal to a voltage signal.

The correction signal generator 77 corresponds to the correction signal generator 61 shown in FIG. 5A. The correction signal generator 77 binarizes the voltage signal with a comparator, generates a K clock, and outputs the K clock to the AD converters 74*a* to 74*c*. The K clock is to be generated with a higher frequency than the frequency of the analog signal in the main interferometer. The frequency of the K clock may by multiplied (e.g., by eight times) to a higher frequency by the correction signal generator 77.

Figure 8:
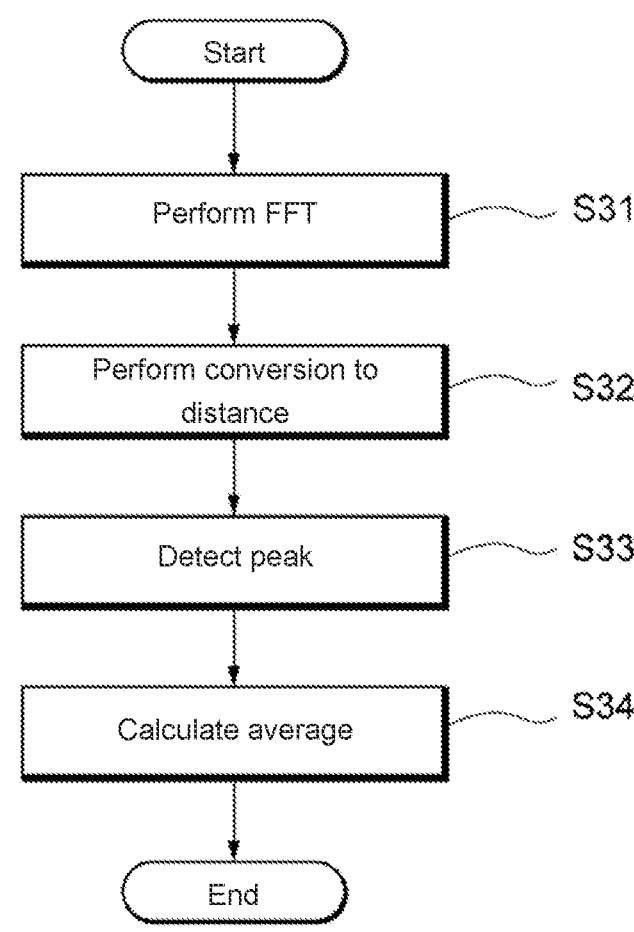
FIG. 8 is a flowchart illustrating a method for calculating a distance to a measurement target T with a processor in a controller.

FIG. 8 is a flowchart showing a method for calculating the distance to the measurement target T with the processor 59 in the controller 30. As shown in FIG. 8, the method includes steps S31 to S34.

Figure 9A:
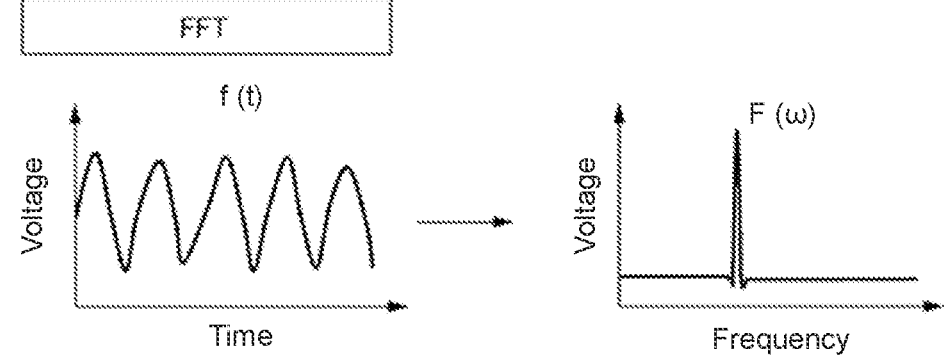
FIG. 9A is a diagram illustrating a conversion of a time domain signal (e.g., voltage versus time) to a frequency spectrum (e.g., voltage versus frequency).

In step S31, the processor 59 converts the waveform signal (voltage versus time) to a frequency spectrum (voltage versus frequency) using an FFT such as is shown in EQ(1) below. FIG. 9A is a diagram of conversion of the waveform signal (voltage versus time) to a frequency spectrum (voltage versus frequency).

$$\sum_{t=0}^{N-1} f(t)\exp\left(-i\frac{2\pi\omega t}{N}\right) = F(\omega) \qquad \text{EQ(1)}$$

In the above equation EQ(1), N is the number of data points.

Figure 9B:
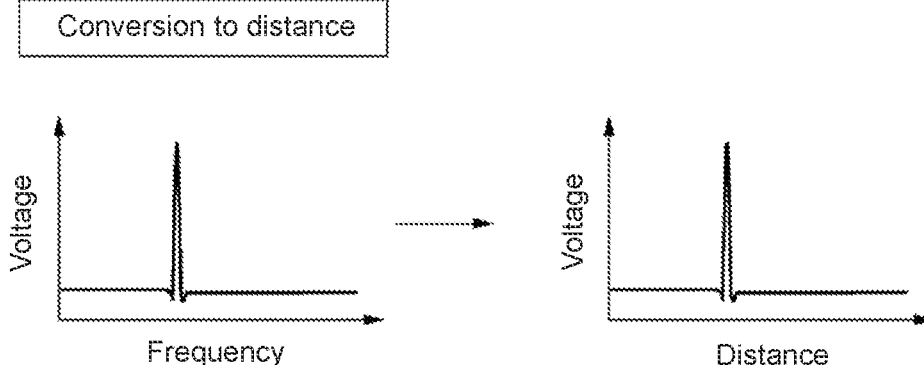
FIG. 9B is a diagram illustrating a conversion of a frequency spectrum (e.g., voltage versus frequency) to a distance spectrum (e.g., voltage versus distance).

In step S32, the processor 59 converts the frequency spectrum (voltage versus frequency) to a distance spectrum (voltage versus distance). FIG. 9B is a diagram of conversion of the frequency spectrum (voltage versus frequency) to a distance spectrum (voltage versus distance).

Figure 9C:
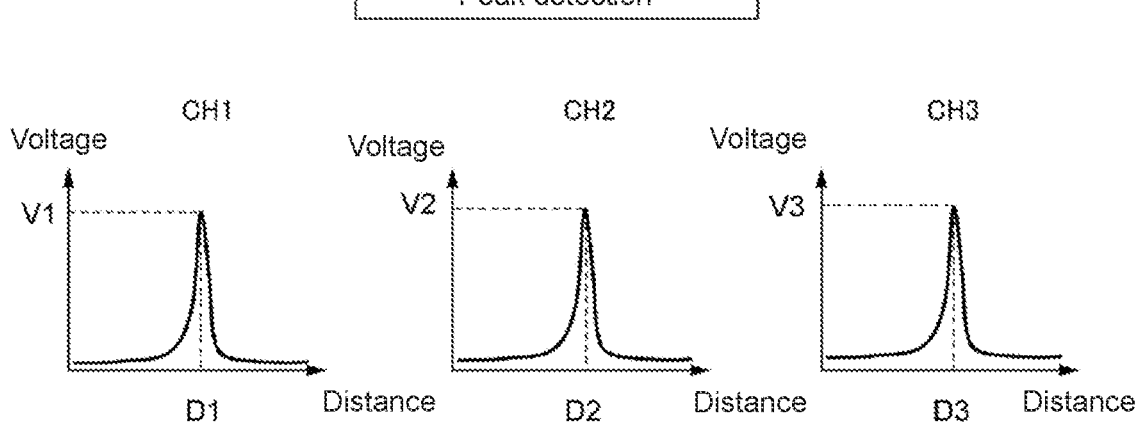
FIG. 9C is a diagram illustrating peak detection based on distance spectra (e.g., voltage versus distance) and calculation of distance values corresponding to a respective peaks.

In step S33, the processor 59 calculates the distance value corresponding to a peak based on the distance spectrum (voltage versus distance). FIG. 9C is a diagram of peak detection based on distance spectra (voltage versus distance) and calculation of distance values corresponding to the respective peaks. In FIG. 9C, peaks are detected in three channels based on the respective spectra (voltage versus distance) to calculate the distance values corresponding to the respective peaks.

In step S34, the processor 59 calculates an average of the distance values calculated in step S33. More specifically, the processor 59 calculates an average of the distance values calculated from the respective peaks detected based on the spectra (voltage versus distance) in the three channels in step S33. The processor 59 outputs the average of the values as the distance to the measurement target T.

In step S34, the processor 59 may calculate an average of distance values with a signal-to-noise ratio (SNR) greater than or equal to a threshold selected from the distance values calculated in step S33. For example, among the peaks detected in all of the three channels based on the respective spectra (voltage versus distance), any distance value calculated based on a spectrum with a SNR less than the threshold is determined to be less reliable and is not used.

Specific embodiments of the present disclosure will now be described in detail focusing on distinctive components, functions, and characteristics. An optical interferometric range sensor described below corresponds to the displacement sensor 10 described with reference to FIGS. 1 to 9C. All or some of the basic components, functions, and characteristics of the optical interferometric range sensor are the same as the components, functions, and characteristics of the displacement sensor 10 described with reference to FIGS. 1 to 9C.

First Embodiment

Structure of Optical Interferometric Range Sensor

Figure 10:
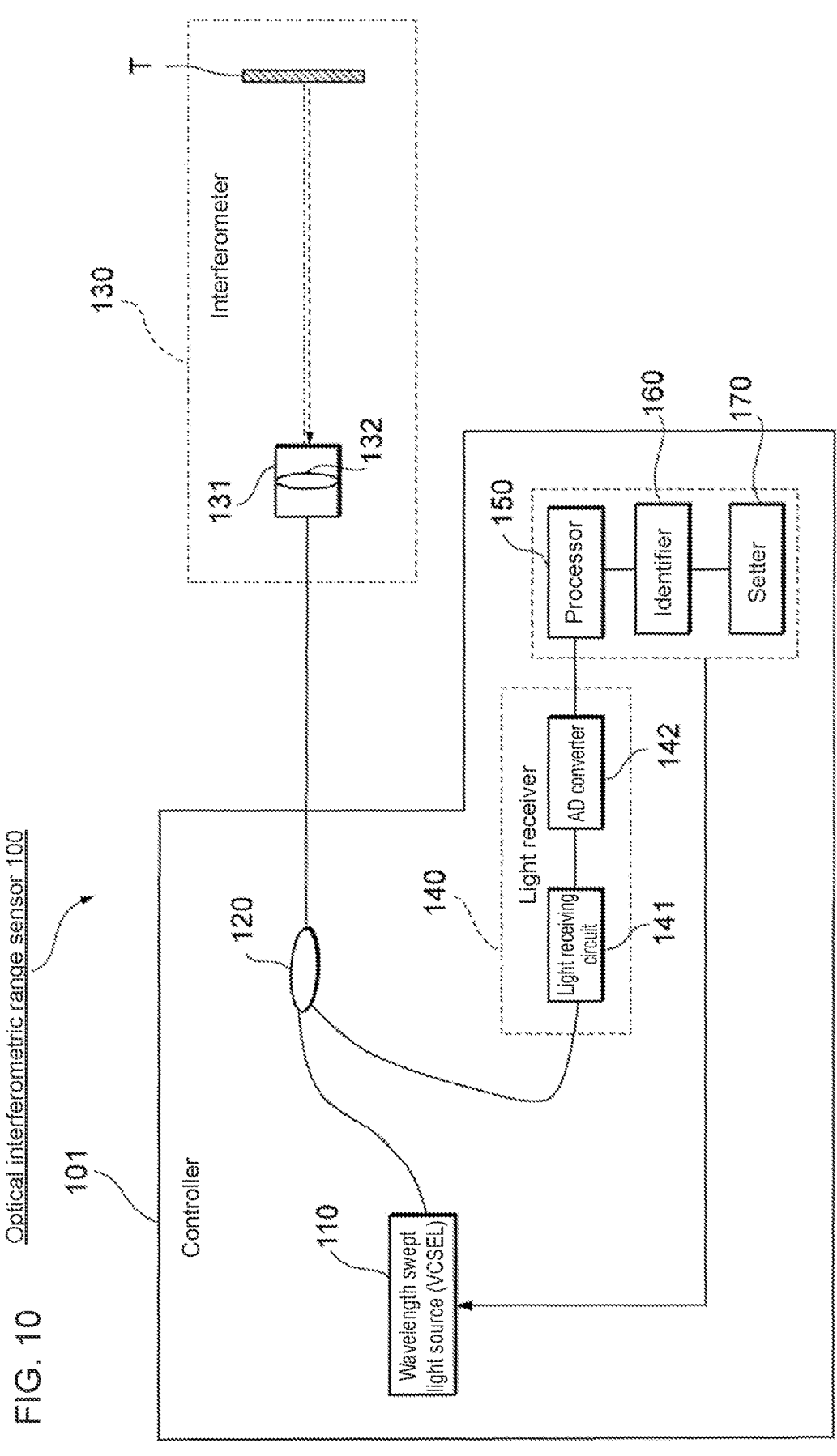
FIG. 10 is a schematic diagram illustrating an optical interferometric range sensor according to a first embodiment or embodiments.

FIG. 10 is a schematic diagram of an optical interferometric range sensor 100 according to a first embodiment or embodiments. As shown in FIG. 10, the optical interferometric range sensor 100 includes a wavelength swept light source 110, a light splitter 120, an interferometer 130, a light receiver 140, a processor 150, an identifier 160, and a setter 170. The interferometer 130 includes a sensor head 131 with an objective lens 132. The light receiver 140 includes a light receiving circuit 141 including light receiving elements and an AD converter 142.

The wavelength swept light source 110, the light splitter 120, the light receiver 140, and the processor 150 are included in a controller 101. The identifier 160 and the setter 170 may be functional components implementable by the processor 150 or by, for example, a separate controller, by executing a program, by a specific hardware configuration, by gate programming of a FPGA or the like as will be appreciated by one of skill in the art. That is, the processor 150 may be configured, by a hardware and/or software configuration, to perform operations as the identifier 160 and the setting 170, for example.

The wavelength swept light source 110 is directly connected to the light splitter 120 or indirectly connected to the light splitter 120 with other components (e.g., the optical amplifier 52, the isolator 53, and the optical coupler 54). The wavelength swept light source 110 emits light with continuously changing wavelengths. In other words, the wavelength of the light emitted from the wavelength swept light source 110 changes continuously.

The light emitted from the wavelength swept light source 110 is transmitted to the interferometer 130 through the light splitter 120 and an optical fiber.

The light splitter 120 includes, for example, an optical coupler or a circulator to direct light emitted from the wavelength swept light source 110 to the interferometer 130 and the returning light from the interferometer 130 to the light receiver 140. The light splitter 120 may include, for example, a 2×2 optical coupler. Furthermore, the light splitter 120 may include, for example, an attenuator to attenuate light spilt toward another path to reduce returning light to the optical coupler.

The interferometer 130 includes the sensor head 131 with the objective lens 132. Light transmitted to the interferometer 130 is input into the sensor head 131 through the optical fiber. A portion of the light input into the sensor head 131 reaches the measurement target T through the objective lens 132 and is reflected from the measurement target T as measurement light. The measurement light reflected from the measurement target T is then collected by the objective lens 132 in the sensor head 131 to be input into the sensor head 131. Another portion of the light input into the sensor head 131 is reflected from a reference surface at the end of the optical fiber as reference light. The measurement light and the reference light interfere with each other to form interference light corresponding to the length difference between the optical path for the measurement light and the optical path for the reference light. The interference light is output from the interferometer 130.

The sensor head 131 may include a collimating lens between the end of the optical fiber and the objective lens 132 or may include the collimating lens without including the objective lens 132.

The interference light output from the interferometer 130 is received by the light receiver 140 through the light splitter 120 and converted to an electric signal. More specifically, the light receiver 140 includes the light receiving circuit 141 including light receiving elements and the AD converter 142. The light receiving circuit 141 includes, for example, light receiving elements that are PDs, which receive light output from the light splitter 120 and convert the light to electric signals each corresponding to the received amount of light. The AD converter 142 converts the electric signals from analog signals to digital signals.

The processor 150 calculates the distance from the sensor head 131 to the measurement target T based on the digital signals resulting from conversion performed by the light receiver 140. For example, the processor 150 includes an integrated circuit such as an FPGA. The processor 150 converts each input digital signal to a frequency spectrum using an FFT and calculates the distance to the measurement target T based on the frequency spectra.

The distance from the sensor head 131 to the measurement target T is typically, but not limited to, the distance from the distal end of the sensor head 131 to the measurement target T. The processor 150 calculates the distance. For example, the processor 150 may calculate, as the distance from the sensor head 131 to the measurement target T, the distance from the end of the optical fiber connected to the sensor head 131 to the measurement target T, the distance from the objective lens 132 in the sensor head 131 to the measurement target T, or the distance from a reference position preset within the sensor head 131 to the measurement target T.

The measurement distance to the measurement target T, the type of sensor head 131, and the circuit bandwidth in the processor 150 will now be described.

FIGS. 11A and 11B each show the relationship between the measurement distance to the measurement target T, the type of sensor head 131, and the circuit bandwidth in the processor 150 in an example. As shown in FIG. 11A, for a shorter measurement distance to the measurement target T, a short-range sensor head 131a with an appropriate objective lens 132a is used based on the focal length to the measurement target T. As shown in FIG. 11B, for a longer measurement distance to the measurement target T, a long-range sensor head 131*b* with an appropriate objective lens 132*b* is used based on the focal length to the measurement target T.

In the structure in FIG. 11A, the controller 101 detects, with the processor 150, a signal peak of the interference light received by the light receiver 140. The processor 150 calculates the distance from the sensor head 131*a* to the measurement target T based on the frequency at the signal peak. For the processor 150 to appropriately calculate the distance to the measurement target T, the measurement conditions are set with the processor 150 to allow the frequency at the signal peak based on the interference light received by the light receiver 140 to fall within the circuit bandwidth of the light receiver 140. In other words, the measurement conditions are appropriately set to correspond to the short-range sensor head 131*a*.

In FIG. 11B, the measurement distance to the measurement target T is longer, and a long-range sensor head 131*b* is used. Accordingly, the processor 150 is expected to detect the frequency at a signal peak based on the interference light received by the light receiver 140 in a high frequency band. When the measurement conditions corresponding to the short-range sensor head 131*a* described above are set for the long-range sensor head 131*b*, the processor 150 cannot detect the frequency at the signal peak based on the interference light received by the light receiver 140 and may inappropriately calculate the distance from the sensor head 131*b* to the measurement target T. In other words, the measurement conditions corresponding to the long-range sensor head 131*b* are to be set with the processor 150 to allow the frequency at the signal peak based on the interference light received by the light receiver 140 to fall within the circuit bandwidth of the light receiver 140.

More specifically, the type of sensor head 131 is identified as the short-range sensor head 131*a* or the long-range sensor head 131*b* to set measurement conditions corresponding to the identified type of sensor head.

Identifying Type of Sensor Head

The identifier 160 identifies the type of sensor head 131 based on a beat signal generated by the interferometer 130.

Figure 12A:
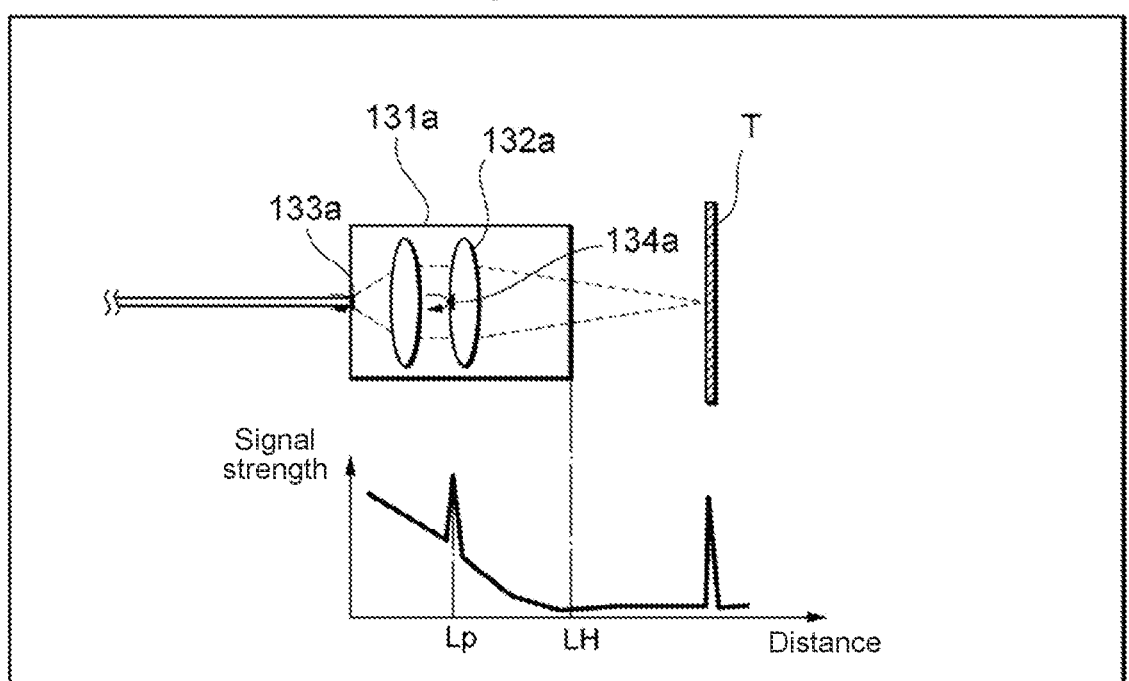
FIG. 12A and FIG. 12B each are schematic diagrams illustrating a sensor head to be identified as a short-range sensor head or a long-range sensor head in an example.
Figure 12B:
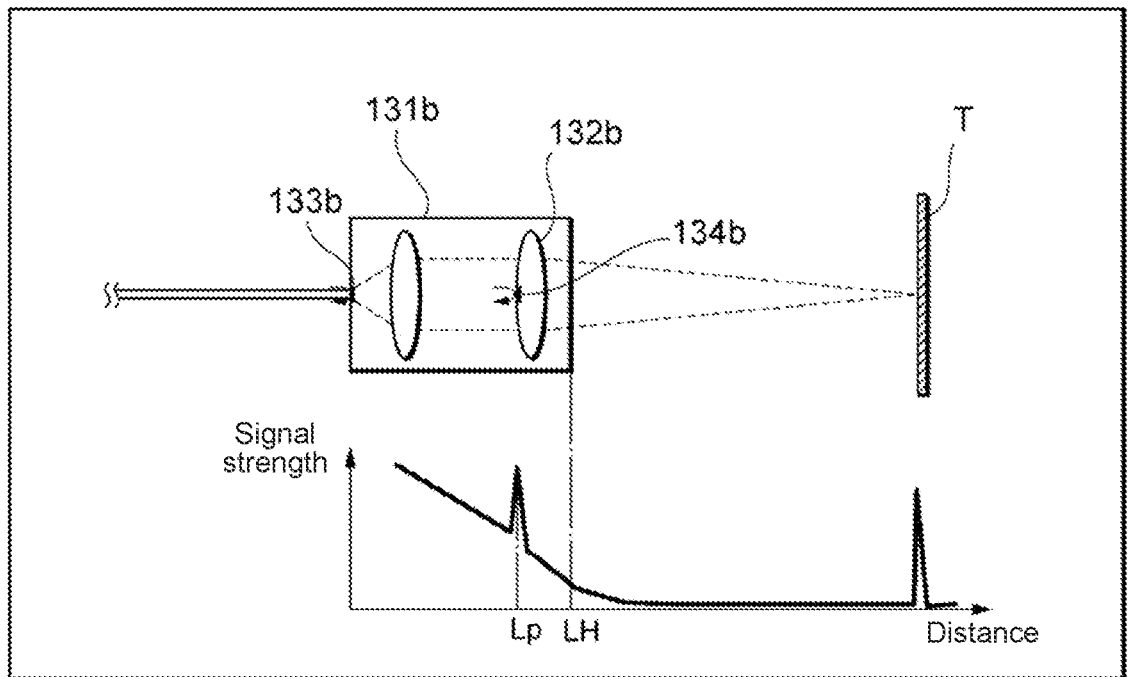

FIGS. 12A and 12B are each a schematic diagram of the sensor head 131 to be identified as a short-range sensor head 131*a* or a long-range sensor head 131*b* in an example. As shown in FIG. 12A, a portion of the light input into the sensor head 131*a* through the optical fiber reaches the measurement target T as measurement light and is reflected from the measurement target T. Another portion of the light input into the sensor head 131*a* is reflected from a reference surface 133*a* at the end of the optical fiber as reference light. The measurement light and the reference light form interference light, allowing detection of the distance from the sensor head 131*a* to the measurement target T as a signal peak.

Still another portion of the light input into the sensor head 131*a* through the optical fiber is reflected from a reflective surface 134*a* on the objective lens 132*a*. The reflected light and the reference light described above form a beat signal (interference light), allowing detection of a position Lp of the objective lens 132*a* (specifically, the reflective surface 134*a*) in the sensor head 131*a* (specifically, in the area from a distal end position LH of the sensor head 131*a* toward the reference surface 133*a*) as a signal peak.

The reflective surface 134*a* on the objective lens 132*a* may be on either surface of the objective lens 132*a*. The reflective surface 134*a* may be a partial reflective coating applied to the objective lens 132*a*, or may be a portion using Fresnel reflection with, for example, low reflectance (about 5% or less).

Similarly, in the structure in FIG. 12B, the objective lens 132*b* in the sensor head 131*b* (specifically, in the area from a distal end position LH of the sensor head 131*b* toward a reference surface 133*b*) includes a reflective surface 134*b* to reflect a portion of the light input into the sensor head 131*b* through the optical fiber. The reflected light and the reference light described above form a beat signal (interference light), allowing detection of a position Lp of the objective lens 132*b* (specifically, the reflective surface 134*b*) in the sensor head 131*b* as a signal peak.

In the manner described above, a beat signal is generated by the interferometer 130 including the sensor head 131*a* or the sensor head 131*b*. The beat signal is received by the light receiver 140, allowing detection of the signal peak as shown in FIGS. 12A and 12B.

The identifier 160 may identify the type of sensor head 131 based on the peak of the beat signal, with, for example, the objective lens 132*a* and the objective lens 132*b* at different positions respectively in the short-range sensor head 131*a* and the long-range sensor head 131*b*.

Measurement Conditions Corresponding to Type of Sensor Head

The setter 170 sets measurement conditions corresponding to the type of sensor head 131 identified by the identifier 160. Referring back to FIG. 11B, the measurement conditions set with the processor 150 include, for example, adjusting the sweep rate of the wavelength swept light source 110. The measurement conditions are set to allow the high frequency at the signal peak based on the interference light received by the light receiver 140 to fall within the circuit bandwidth of the light receiver 140.

The sweep rate herein refers to the frequency sweep width per sweep time, calculated with the sweep rate $\alpha=\delta f/T$ (where $\delta f$ is the frequency sweep width, and T is the sweep time) based on the frequency sweep width and the sweep time in accordance with the frequency-modulated continuous-wave (FMCW) method. A coherent FMCW will be described in detail.

FIG. 13 is a diagram describing a coherent FMCW. As described above, the wavelength swept light source 110 emits light with the continuously changing wavelength (frequency). The measurement light reaching and reflected from the measurement target T and the reference light reflected from the reference surface at the end of the optical fiber have a difference in optical path lengths, thus forming interference light.

As shown in FIG. 13, the light emitted from the wavelength swept light source 110 includes the measurement light delayed from the reference light by the optical path length difference to cause interference. The resultant light is received by the light receiver 140 as a beat signal (interference light) having a beat frequency that is the difference in frequency between the measurement light and the reference light. The beat frequency fb is calculated with $fb=\delta f/T\cdot 2Ln/c$, where $\delta f$ is the frequency sweep width, T is the sweep time, L is the distance from the end (reference surface) of the optical fiber to the measurement target T, n is the refractive index in the optical path difference, and c is the speed of light.

Referring back to FIG. 11B, the measurement conditions set with the processor 150 are to include a lower sweep rate $\alpha$ ($\delta f/T$) to allow the frequency (beat frequency) at the signal peak based on the interference light received by the light receiver 140 to fall within the circuit bandwidth of the light receiver 140.

Method for Setting Measurement Conditions Corresponding to Type of Sensor Head

A method for setting measurement conditions corresponding to the type of sensor head 131 will now be described.

Figure 14:
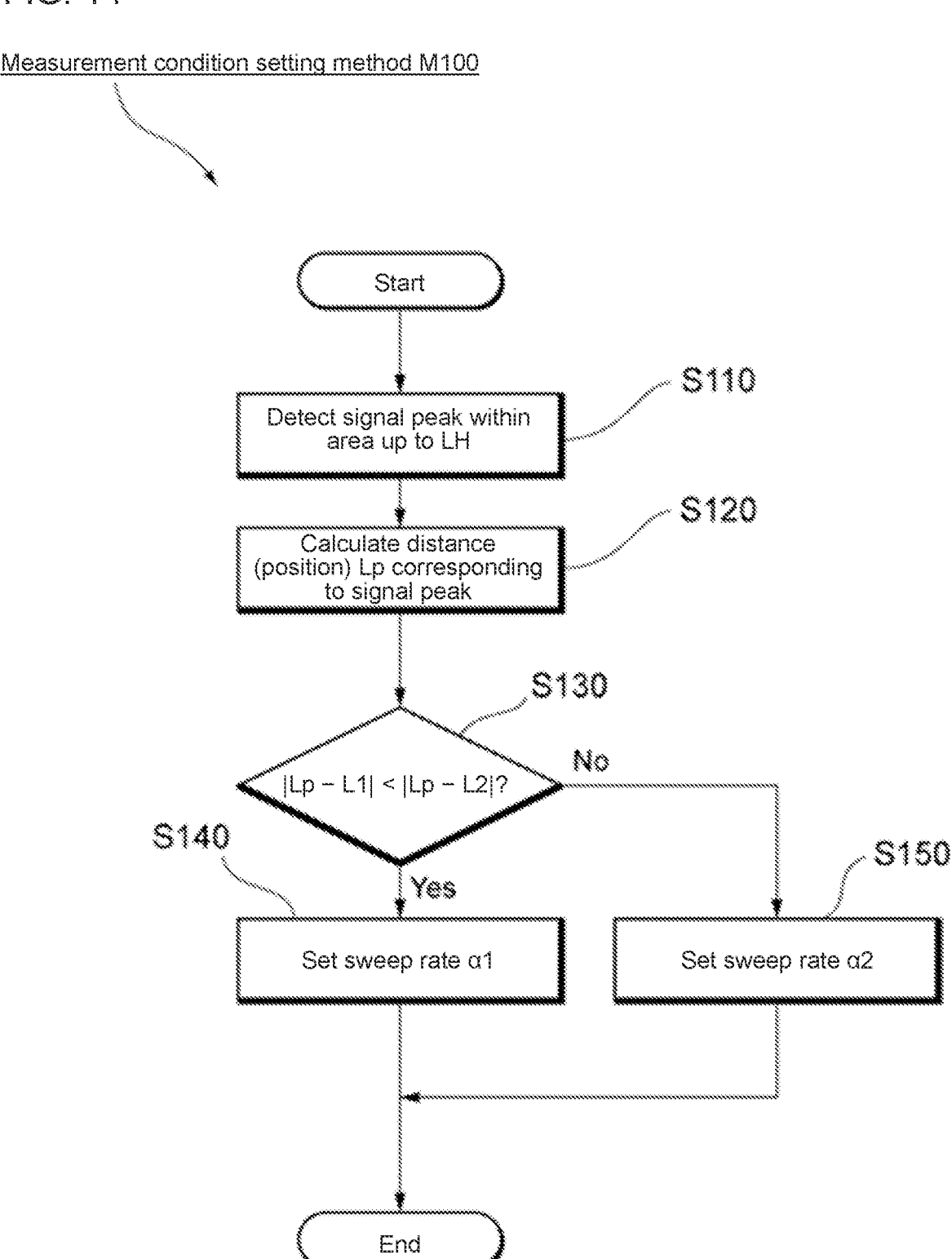
FIG. 14 is a flowchart illustrating a measurement condition setting method including identifying a type of sensor head and setting a measurement condition corresponding to an identified type of sensor head.

FIG. 14 is a flowchart showing a measurement condition setting method M100 including identifying the type of sensor head 131 and setting a measurement condition corresponding to the identified type of sensor head 131. As shown in FIG. 14, the measurement condition setting method M100 includes steps S110 to S150. Each step is performed by the processor included in the optical interferometric range sensor 100.

In step S110, the identifier 160 detects a signal peak based on the interference light received by the light receiver 140 within the area up to the distal end position LH of the sensor head.

In step S120, the identifier 160 calculates a distance Lp corresponding to the signal peak detected in step S110.

In step S130, the identifier 160 identifies the sensor head 131 as a sensor head 131a set as a short-range sensor or a sensor head 131b set as a long-range sensor based on the distance (position) Lp calculated in step S120.

In an example, for the short-range sensor head 131a, the objective lens 132a (reflective surface 134a) is pre-positioned to achieve Lp=L1. For the long-range sensor head 131b, the objective lens 132b (reflective surface 134b) is pre-positioned to achieve Lp=L2. The distance Lp calculated in step S120 is determined to be closer to (corresponds to) the distance L1 or the distance L2 with comparison of |Lp−L1| and |Lp−L2|.

When determining that the distance Lp corresponds to the distance L1 in step S130 (Yes in step S130), the identifier 160 identifies the short-range sensor head 131a as the sensor head 131 being used. In step S140, the setter 170 sets a measurement condition corresponding to the short-range sensor head 131a. In an example, the setter 170 sets a sweep rate α1 with the wavelength swept light source 110 as a measurement condition corresponding to the short-range sensor head 131a.

When determining that the distance Lp corresponds to the distance L2 in step S130 (No in step S130), the identifier 160 identifies the long-range sensor head 131b as the sensor head 131 being used. In step S150, the setter 170 sets a measurement condition corresponding to the long-range sensor head 131b. In an example, the setter 170 sets a sweep rate α2 with the wavelength swept light source 110 as a measurement condition corresponding to the long-range sensor head 131b.

The measurement condition setting method M100 may be performed upon setting measurement conditions for measurement of the measurement target T, or for example, before start of the measurement or upon each measurement of the measurement target T.

As described above, the optical interferometric range sensor 100 according to the first embodiment or embodiments includes the identifier 160 that identifies the sensor head 131 as a short-range sensor head or a long-range sensor head based on the beat signal generated by the interferometer 130. The setter 170 then adjusts the sweep rate as a measurement condition corresponding to the type of sensor head 131 identified by the identifier 160, which may allow an appropriate measurement condition to be set for the measurement distance to the measurement target T, thus allowing appropriate measurement of the measurement distance to the measurement target T. Accordingly, the structure may reduce the user work of, for example, identifying the type of sensor head 131 and manually setting the corresponding measurement conditions in each measurement operation.

Each of the sensor head 131a and the sensor head 131b described with reference to FIGS. 12A and 12B includes a collimating lens between the end of the optical fiber and the objective lens 132a or 132b. The structure collimates light incident on the objective lens 132a or 132b, thus allowing more flexibility in the position of the reflective surface 134a or 134b on the objective lens 132a or 132b.

The short-range sensor head 131a and the long-range sensor head 131b may have any structures, other than the structures shown in FIGS. 12A and 12B, that may identify the type of sensor head 131 based on the beat signal generated by the interferometer 130. Such structures that allow identification of the type of sensor head 131 will now be described.

Examples of Structures for Identifying a Type of Sensor Head

First Example

Figure 15A:
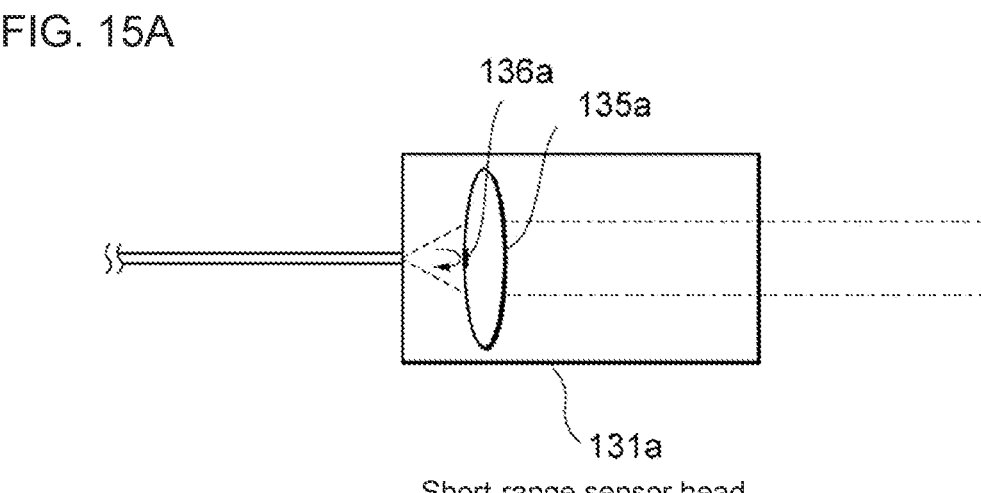
FIGS. 15A and 15B each are schematic diagrams illustrating a sensor head including a collimating lens to be identified as a short-range sensor head or a long-range sensor head in an example.
Figure 15B:
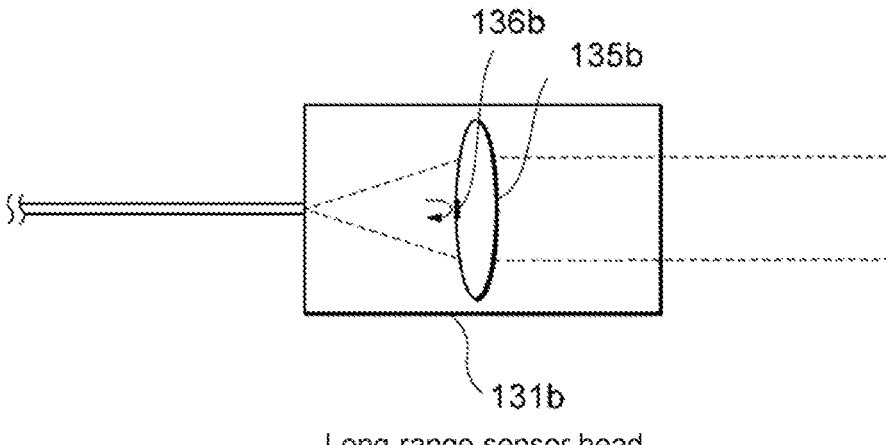

FIGS. 15A and 15B are each a schematic diagram of a sensor head 131 including a collimating lens to be identified as a short-range sensor head 131a or a long-range sensor head 131b in an example. As shown in FIGS. 15A and 15B, the short-range sensor head 131a includes a collimating lens 135a without an objective lens, and the long-range sensor head 131b includes a collimating lens 135b without an objective lens.

The collimating lens 135a includes a reflective surface 136a to reflect a portion of the light input into the sensor head 131a through the optical fiber. The collimating lens 135b includes a reflective surface 136b to reflect a portion of the light input into the sensor head 131b through the optical fiber.

The collimating lens 135a and the collimating lens 135b are at different positions in the respective short-range sensor head 131a and long-range sensor head 131b to allow the identifier 160 to identify the type of sensor head 131 based on the peak of the beat signal.

The sensor head 131a and the sensor head 131b described with reference to FIGS. 15A and 15B each have a simple structure without an objective lens, thus facilitating detection of the peak of the beat signal.

Second Example

Figure 16A:
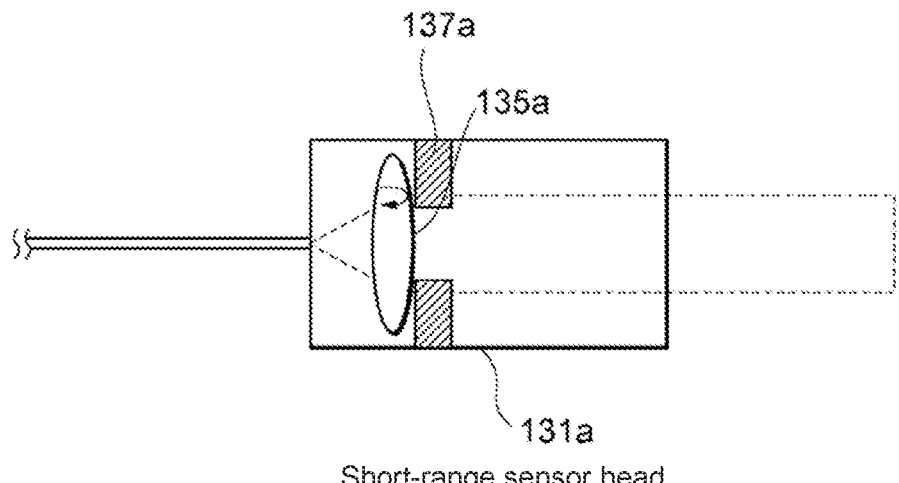
FIGS. 16A and 16B each are schematic diagrams illustrating a sensor head including an internal component including a reflective surface to be identified as a short-range sensor head or a long-range sensor head in an example.
Figure 16B:
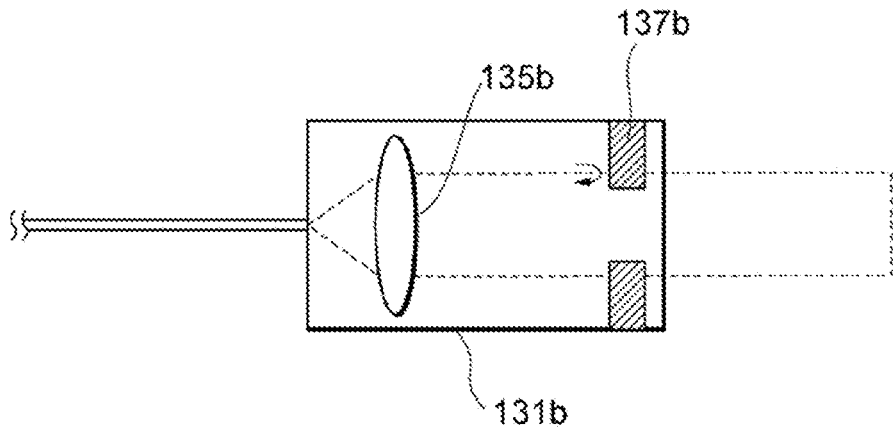

FIGS. 16A and 16B are each a schematic diagram of a sensor head 131 including an internal component including a reflective surface to be identified as a short-range sensor head 131a or a long-range sensor head 131b in an example. As shown in FIGS. 16A and 16B, the short-range sensor head 131a includes a predetermined component 137a inside the housing, and the long-range sensor head 131b includes a predetermined component 137b inside the housing.

The predetermined component 137a reflects, within the housing of the short-range sensor head 131a, a portion of the light input into the short-range sensor head 131a through the optical fiber. The predetermined component 137b reflects, within the housing of the long-range sensor head 131b, a portion of the light input into the long-range sensor head 131b through the optical fiber.

The predetermined component 137a and the predetermined component 137b are at different positions in the respective short-range sensor head 131a and long-range sensor head 131b to allow the identifier 160 to identify the type of sensor head 131 based on the peak of the beat signal.

The sensor head 131a and the sensor head 131b described with reference to FIGS. 16A and 16B each eliminate a reflective surface located on a collimating lens or an objective lens, facilitating detection of the peak of the beat signal with the predetermined component 137a or 137b positioned to reflect a portion of the light input into the sensor head 131a or 131b.

The predetermined components 137a and 137b may each be a portion of a component of the short-range sensor head 131a or the long-range sensor head 131b, or may be a separate component for generating the peak of the beat signal.

Third Example

Figure 17A:
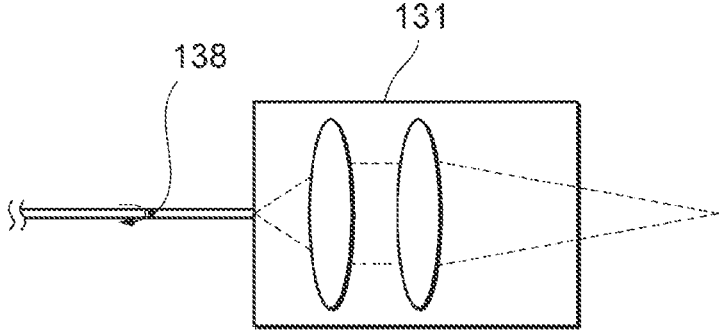
FIG. 17A is a schematic diagram illustrating an optical fiber including a reflective surface to allow identification of a type of sensor head in an example.

FIG. 17A is a schematic diagram of an optical fiber including a reflective surface to allow identification of the type of sensor head 131 in an example. As shown in FIG. 17A, a reflective surface 138 is located inside the optical fiber that guides light to the sensor head 131, instead of inside the sensor head 131. More specifically, the reflective surface 138 may be a partial reflective coating applied to a joint of optical fibers.

For example, an optical fiber connected to a short-range sensor head 131a and an optical fiber connected to a long-range sensor head 131b may include reflective surfaces 138 at different positions, which may allow the identifier 160 to identify the type of sensor head 131 based on the peak of the beat signal.

For a Fizeau interferometer, the end (end face) of the optical fiber is used as the position at which the optical path difference is zero. The peak of the beat signal thus occurs, along the return path, in an area toward the distal end of the sensor head 131 from the position at which the optical path difference is zero.

Figure 17B:
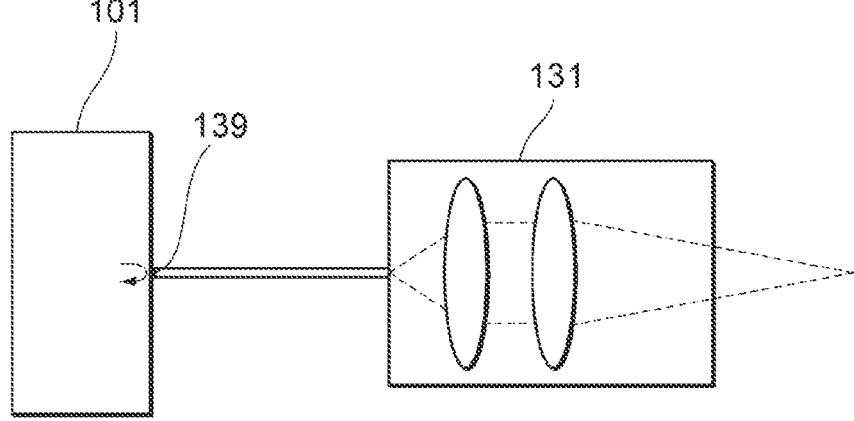
FIG. 17B is a schematic diagram illustrating an optical fiber including a reflective surface at an end (end face) adjacent to a controller to allow identification of a type of sensor head in an example.

FIG. 17B is a schematic diagram of an optical fiber including a reflective surface at an end (end face) adjacent to a controller 101 to allow identification of the type of sensor head 131 in an example. As shown in FIG. 17B, a reflective surface 139 is located at, instead of inside the sensor head 131, the end (end face) of the optical fiber adjacent to the controller 101 that guides light to the sensor head 131. More specifically, the reflective surface 139 may be a partial reflective coating applied to the end (end face) of the optical fiber adjacent to the controller 101.

For a Fizeau interferometer, the end (end face) of the optical fiber is used as the position at which the optical path difference is zero. The peak of the beat signal thus occurs, along the return path, in an area toward the distal end of the sensor head 131 offset from the position at which the optical path difference is zero by the optical path length difference.

Using such peak occurrence, an optical fiber connected to a short-range sensor head 131a and an optical fiber connected to a long-range sensor head 131b may be designed to have different lengths (optical path lengths) to allow the identifier 160 to identify the type of sensor head 131 based on the peak of the beat signal.

As described above, the reflective surface is located inside the sensor head 131 including the collimating lens, the objective lens, and other components, or located inside or on an end face of the optical fiber to generate a beat signal in the interferometer 130. A short-range sensor head 131a and a long-range sensor head 131b may be designed to allow detection of different peaks in the beat signals to allow the identifier 160 to identify the type of sensor head 131 based on the peak of the beat signal.

For the structure to detect different peaks in the beat signals, the structures described with reference to FIGS. 12A, 12B, 15A, 15B, 16A, 16B, 17A, and 17B may be combined. For example, for a short-range sensor head 131a being used, the predetermined component 137a is placed inside the sensor head 131a (FIG. 16A). For a long-range sensor head 131b being used, the reflective surface 138 is located inside the optical fiber (FIG. 17A).

Fourth Example

FIGS. 18A and 18B are each a schematic diagram of a sensor head 131 to be identified as a short-range sensor head 131a or a long-range sensor head 131b based on the number of peaks in the beat signal in an example. As shown in FIGS. 18A and 18B, the short-range sensor head 131a and the long-range sensor head 131b have different structures. The type of sensor head 131 is identified based on the number of peaks, instead of the frequency (position and distance) at the peak of the beat signal generated by the interferometer 130.

More specifically, as shown in FIG. 18A, the short-range sensor head 131a includes a collimating lens 135a and an objective lens 132a. A portion of the light input into the sensor head 131a through the optical fiber is reflected from a reflective surface 136a on the collimating lens 135a, and another portion of the light is reflected from a reflective surface 134a on the objective lens 132a. Each of the light reflected from the reflective surface 136a and the light reflected from the reflective surface 134a forms a beat signal (interference light) with the reference light reflected from a reference surface 133a at the end of the optical fiber, which allows detection of a position Lp1 of the collimating lens 135a (specifically, the reflective surface 136a) and a position Lp2 of the objective lens 132a (specifically, the reflective surface 134a) as signal peaks within the sensor head 131a (specifically, in the area from the distal end position LH of the sensor head 131a toward the reference surface 133a).

As shown in FIG. 18B, the long-range sensor head 131b includes a collimating lens 135b without including an objective lens. A portion of the light input into the sensor head 131b through the optical fiber is reflected from a reflective surface 136b on the collimating lens 135b. The reflected light then forms a beat signal (interference light) with the reference light reflected from a reference surface 133b at the end of the optical fiber, which allows detection of a position Lp of the collimating lens 135b (specifically, the reflective surface 136b) as a signal peak within the sensor head 131b (specifically, in the area from the distal end position LH of the sensor head 131b toward the reference surface 133b).

As described above, the short-range sensor head 131a includes the collimating lens 135a and the objective lens 132a, and the long-range sensor head 131b includes the collimating lens 135b. The identifier 160 may identify the type of sensor head 131 based on the number of peaks detected in the beat signal.

Figure 19:
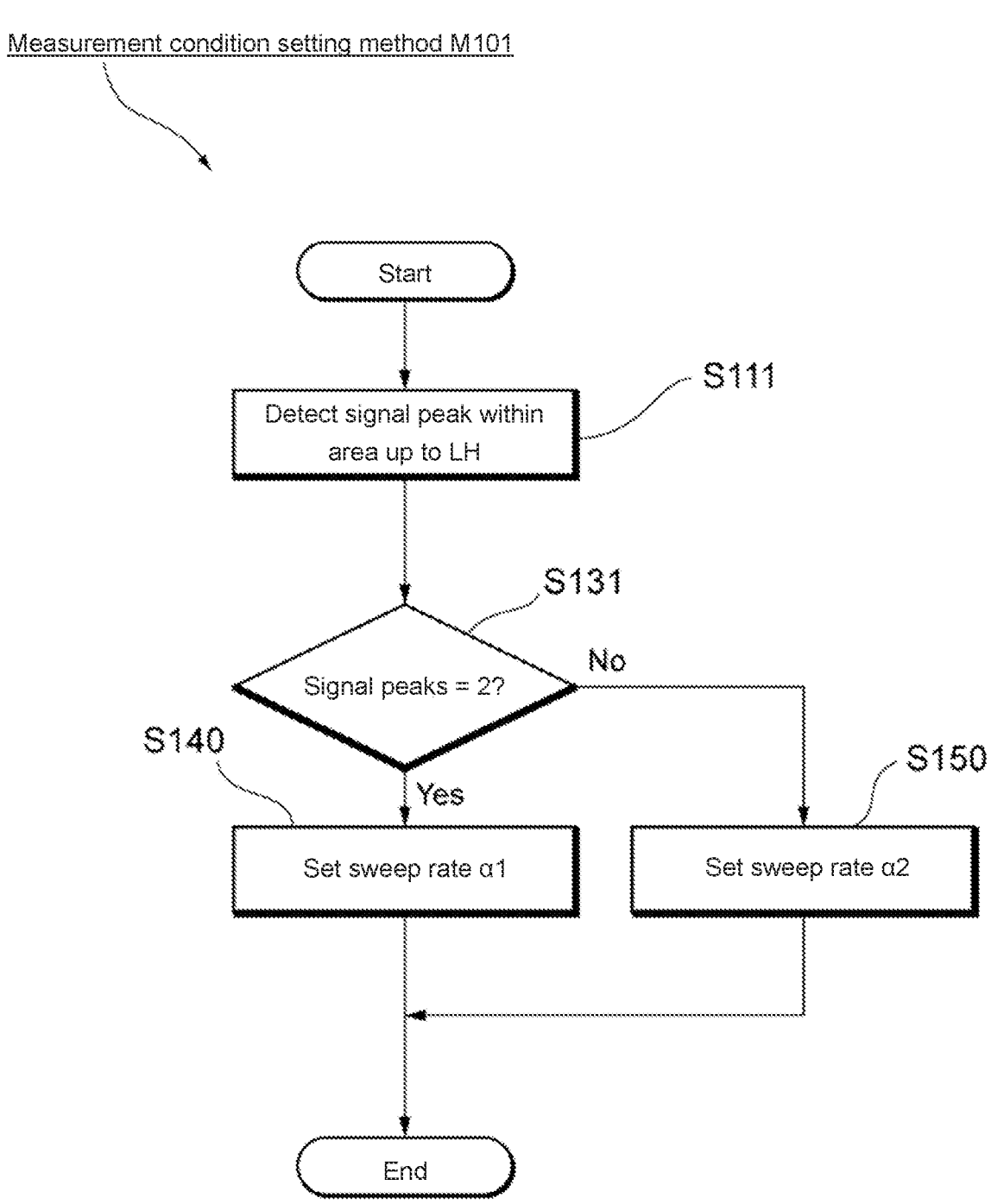
FIG. 19 is a flowchart illustrating a measurement condition setting method including identifying a type of sensor head based on a number of peaks detected in a beat signal and setting a measurement condition corresponding to an identified type of sensor head.

FIG. 19 is a flowchart showing a measurement condition setting method M101 including identifying the type of sensor head 131 based on the number of peaks detected in the beat signal and setting a measurement condition corresponding to the identified type of sensor head 131. As shown in FIG. 19, the measurement condition setting method M101 includes steps S111, S131, S140, and S150. Each step is performed by the processor included in the optical interferometric range sensor 100.

In step S111, the identifier 160 detects any signal peak based on the interference light received by the light receiver 140 within the area up to the distal end position LH of the sensor head. For example, the identifier 160 may detect any signal peak having a signal strength of a predetermined value or greater.

In step S131, the identifier 160 determines the number of signal peaks detected in step S111.

In an example, for the short-range sensor head 131a, the collimating lens 135a and the objective lens 132a are pre-positioned to cause two signal peaks (as in, for example, FIG. 18A). For the long-range sensor head 131b, the collimating lens 135b is pre-positioned to cause one signal peak (as in, for example, FIG. 18B).

The identifier 160 then determines whether the number of signal peaks detected in step S111 is two to identify the type of sensor head as a sensor head 131a set as a short-range sensor head or a sensor head 131b set as a long-range sensor head.

When determining that the number of signal peaks is two in step S131 (Yes in step S131), the identifier 160 identifies a short-range sensor head 131a as the sensor head 131 being used. In step S140, the setter 170 sets a measurement condition corresponding to the short-range sensor head 131a. In an example, the setter 170 sets a sweep rate α1 with the wavelength swept light source 110 as a measurement condition corresponding to the short-range sensor head 131a.

When determining that the number of signal peaks is not two in step S131 (No in step S131), the identifier 160 identifies a long-range sensor head 131b as the sensor head 131 being used. In step S150, the setter 170 sets a measurement condition corresponding to the long-range sensor head 131b. In an example, the setter 170 sets a sweep rate α2 with the wavelength swept light source 110 as a measurement condition corresponding to the long-range sensor head 131b.

In the present embodiment, the identifier 160 identifies a short-range sensor head 131a or a long-range sensor head 131b as the sensor head being used. In some embodiments, identifying the sensor head 131 includes identifying a single sensor head 131 that is switchable between a short-range head sensor and a long-range head sensor. For example, such a single sensor head 131 may be switchable between a short-range sensor head and a long-range sensor head by changing (placing, adding, or eliminating) the collimating lens, the objective lens, and predetermined components within the housing. Accordingly, the identifier 160 identifies the type of sensor head 131.

Second Embodiment

In a second embodiment or embodiments described below, the setter sets another measurement condition in place of or in addition to the sweep rate described in the first embodiment. In the present embodiment, the same reference numerals in the drawings denote the same components of the optical interferometric range sensor 100 according to the first embodiment. Such components will not be described in detail, and components different from those in the first embodiment will be described.

FIG. 20 is a schematic diagram of an optical interferometric range sensor 200 according to the second embodiment or embodiments. As shown in FIG. 20, the optical interferometric range sensor 200 includes a wavelength swept light source 110, a light splitter 120, an interferometer 130, a light receiver 140, a processor 150, an identifier 160, and a setter 270. The interferometer 130 includes a sensor head 131 with an objective lens 132. The light receiver 140 includes a light receiving circuit 141 including light receiving elements and an AD converter 142. The optical interferometric range sensor 200 further includes a light splitter 121 (e.g., an optical coupler) that splits light emitted from the wavelength swept light source 110 to be incident on a main interferometer (interferometer 130) and a secondary interferometer.

The secondary interferometer is used to correct nonlinearity in the swept wavelength of the wavelength swept light source 110, as described with reference to FIGS. 5A, 5B, and 7. The correction signal generator 210 generates a correction signal, referred to as a K clock, and outputs the signal to the AD converter 142. The AD converter 142 converts (samples) the interference light received from the interferometer 130 from an analog signal to a digital signal based on the correction signal, thus correcting the nonlinearity in the swept wavelength of the wavelength swept light source 110.

The processor 150 calculates the distance from the sensor head 131 to the measurement target T based on the digital signal resulting from the AD conversion performed by the AD converter 142. When the number of samples for AD conversion performed by the AD converter 142 is insufficient, the distance may be calculated inappropriately. In other words, the distance to the measurement target T is to be calculated using an appropriate number of samples obtained per cycle of the signal for AD conversion to be performed by the AD converter 142.

As described in the first embodiment or embodiments, for shorter measurement distances to the measurement target T, the identifier 160 identifies a short-range sensor head 131a as the sensor head being used. For longer measurement distances to the measurement target T, the identifier 160 identifies a long-range sensor head 131b as the sensor head being used.

The setter 270 controls the correction signal generator 210 to adjust the degree by which the frequency of the correction signal is multiplied based on the type of sensor head 131 identified by the identifier 160. For example, the setter 270 may set the factor by which the frequency of the correction signal is multiplied to four for the short-range sensor head 131a identified as the sensor head being used by the identifier 160, or may set the factor to eight for the long-range sensor head 131b identified as the sensor head being used by the identifier 160.

The frequency of the correction signal may be adjusted by any degree of multiplication, other than by the factor of four or eight, that allows an appropriate number of samples to be obtained from the signal resulting from AD conversion performed by the AD converter 142 to calculate the distance to the measurement target T appropriately.

The degree by which the frequency of the correction signal is multiplied may be adjusted based on the sweep rate of the wavelength swept light source 110 described in the first embodiment or embodiments. For example, the degree by which the frequency of the correction signal is multiplied may be adjusted based on any sweep rate of the wavelength swept light source 110 adjusted as a measurement condition that is set with the processor 150, which allows the frequency of the signal peak based on the interference light received by the light receiver 140 to fall within the circuit bandwidth of the light receiver 140.

Method for Setting Measurement Conditions Corresponding to Type of Sensor Head

A method for setting measurement conditions corresponding to the type of sensor head 131 will now be described.

Figure 21:
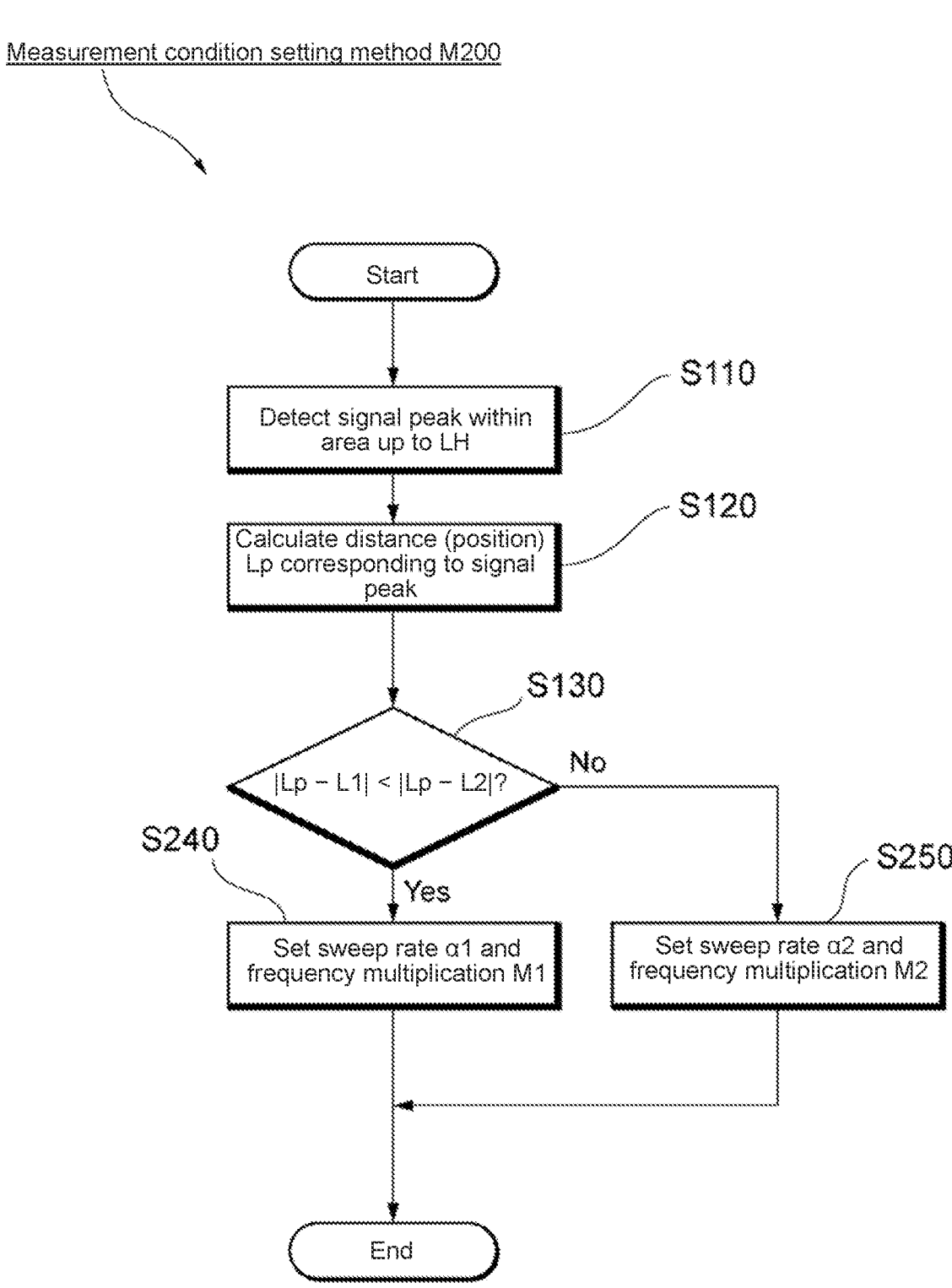
FIG. 21 is a flowchart illustrating a measurement condition setting method including identifying a type of sensor head and setting measurement conditions corresponding to an identified type of sensor head.

FIG. 21 is a flowchart showing a measurement condition setting method M200 including identifying the type of sensor head 131 and setting measurement conditions corresponding to the identified type of sensor head 131. As shown in FIG. 21, the measurement condition setting method M200 includes steps S110 to S130, S240, and S250. Each step is performed by the processor included in the optical interferometric range sensor 200.

Steps S110 to S130 are similar to those in the measurement condition setting method M100 in the first embodiment or embodiments.

In response to the identifier 160 identifying the short-range sensor head 131a as the sensor head 131 being used (Yes in step S130), the setter 270 sets measurement conditions corresponding to the short-range sensor head 131a in step S240. In an example, the setter 270 sets a sweep rate α1 with the wavelength swept light source 110 and a frequency multiplication M1 for the correction signal as measurement conditions corresponding to the short-range sensor head 131a.

In response to the identifier 160 identifying the long-range sensor head 131b as the sensor head 131 being used (No in step S130), the setter 270 sets measurement conditions corresponding to the long-range sensor head 131b in step S250. In an example, the setter 270 sets a sweep rate α2 with the wavelength swept light source 110 and a frequency multiplication M2 for the correction signal as measurement conditions corresponding to the long-range sensor head 131b.

As described above, the optical interferometric range sensor 200 according to the second embodiment or embodiments includes the identifier 160 that identifies the type of sensor head 131 as the short-range sensor head 131a or the long-range sensor head 131b based on the beat signal generated by the interferometer 130. The setter 270 adjusts the degree by which the frequency of the correction signal is multiplied in place of or in addition to the sweep rate as a measurement condition corresponding to the type of sensor head 131 identified by the identifier 160. The structure may allow an appropriate measurement condition to be set for the measurement distance to the measurement target T, thus allowing appropriate measurement of the measurement distance to the measurement target T, which may reduce the user work of, for example, identifying the type of sensor head 131 and manually setting the corresponding measurement conditions in each measurement operation.

Modifications of Interferometer

In each of the embodiments described above, the optical interferometric range sensor 100 or 200 includes the interferometer 130 being a Fizeau interferometer that generates reference light using the end of the optical fiber as a reference surface. The interferometer is not limited to the Fizeau interferometer.

Figure 22A:
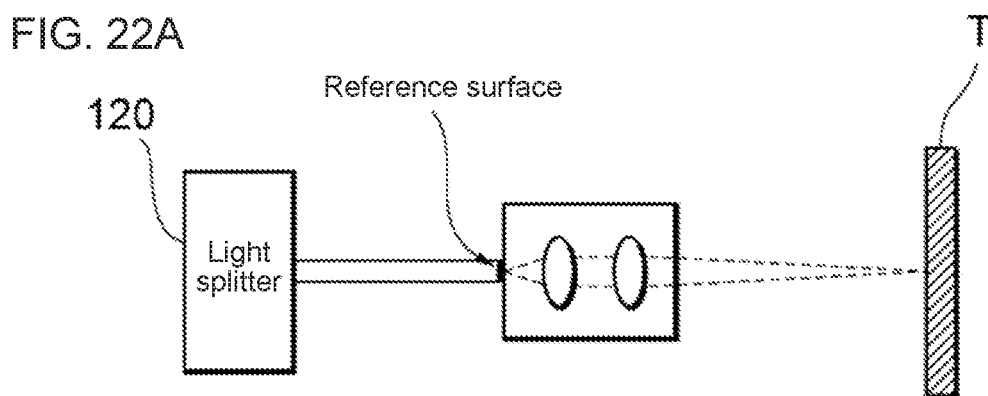
FIG. 22A, FIG. 22B, and FIG. 22C are diagrams illustrating interferometers that generate interference light using measurement light and reference light in accordance with one or more modifications.
Figure 22B:
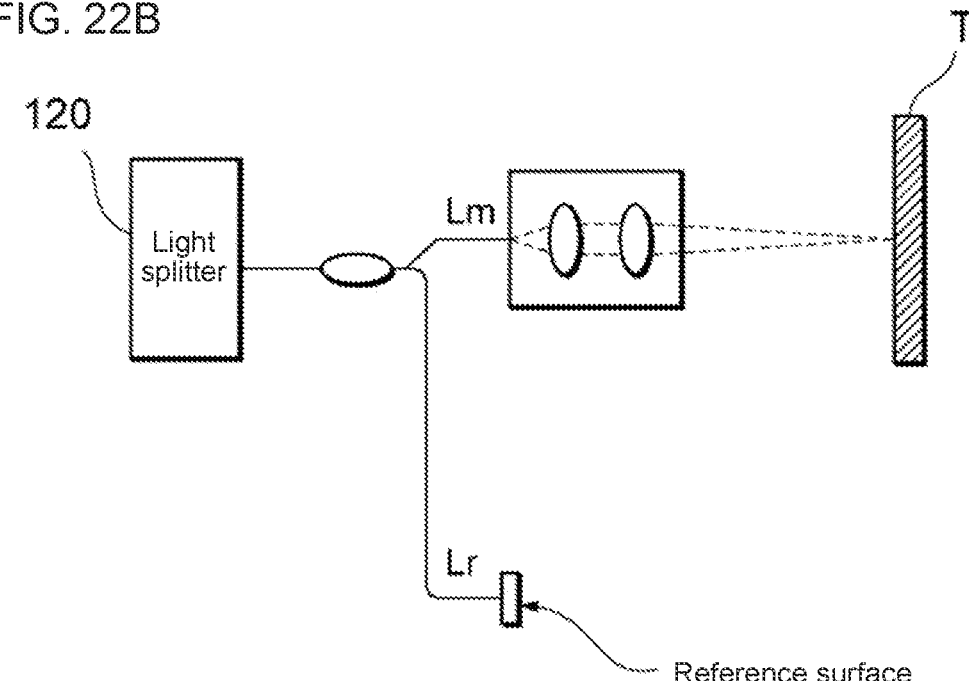
Figure 22C:
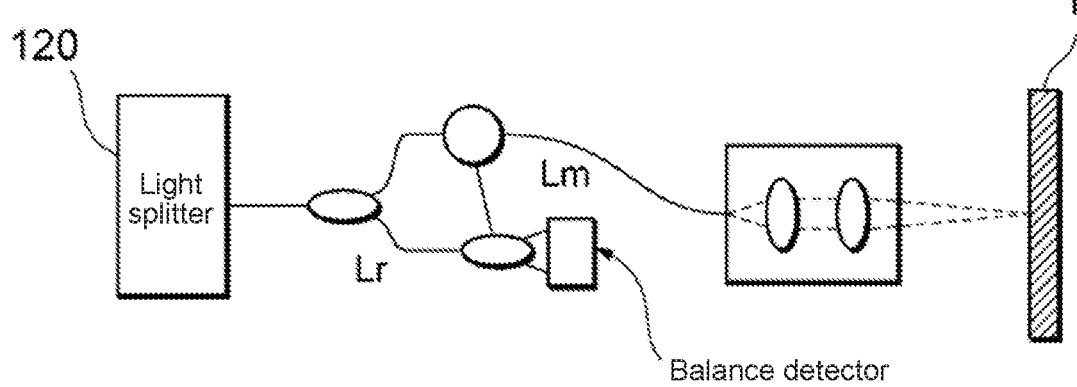

FIGS. 22A, 22B, and 22C are diagrams of interferometers that generate interference light using measurement light and reference light in modifications. In FIG. 22A, the light splitter 120 splits light on an optical path into reference light that uses the end of the optical fiber as a reference surface and measurement light emitted from the sensor head and then reaching and reflected from the measurement target T. Interference light occurs based on the difference in optical path lengths between the reference light and the measurement light.

The structure includes the same interferometer as the interferometer 130 (Fizeau interferometer) in each of the optical interferometric range sensors 100 and 200 according to the embodiments described above. The reference surface may reflect light due to the difference in refractive index between the optical fiber and air (Fresnel reflection). The end of the optical fiber may be coated with a reflective film, or may be coated with a non-reflective film and receive a reflective surface such as a lens surface separately.

In FIG. 22B, the light splitter 120 splits light into measurement light to be guided along a measurement optical path Lm to the measurement target T and reference light to be guided along a reference optical path Lr. The reference optical path Lr includes a reference surface at its end (Michelson interferometer). The reference surface may be an end of an optical fiber coated with a reflective film, or may be an end of an optical fiber coated with a non-reflective film and receiving, for example, a mirror separately. The structure generates interference light with the length difference that is set between the measurement optical path Lm and the reference optical path Lr.

In FIG. 22C, the light splitter 120 splits light into measurement light to be guided along a measurement optical path Lm to the measurement target T and reference light to be guided along a reference optical path Lr. A balance detector is located on the reference optical path Lr (Mach-Zehnder interferometer). The structure generates interference light with the length difference that is set between the measurement optical path Lm and the reference optical path Lr.

As described above, the interferometer is not limited to the Fizeau interferometer described in each embodiment, and may be, for example, a Michelson or Mach-Zehnder interferometer, or any other interferometer that may generate interference light by setting the optical path length difference between the measurement light and the reference light. These or other interferometers may be combined.

In each of the first and second embodiments, the optical interferometric range sensor 100 or 200 is a single-channel sensor, but may be another sensor, for example, a multi-stage optical interferometric range sensor that splits light emitted from the wavelength swept light source 110 using multiple optical couplers. The structure according to one or more embodiments is also applicable to multi-stage optical interferometric range sensors.

The above embodiments intend to facilitate understanding and do not limit the scope. The elements in the embodiments and their positions, materials, conditions, shapes, sizes, or other parameters are not limited to those illustrated above but may be changed as appropriate. The components in different embodiments may be partly combined or interchanged.

APPENDIX

An optical interferometric range sensor (100), comprising:

a light source (110) configured to emit light with a changing wavelength;

an interferometer (130) configured to receive the light emitted from the light source and generate interference light based on measurement light and reference light, the measurement light being light emitted from a sensor head to a measurement target and reflected from the measurement target, the reference light being light traveling on an optical path at least partially different from an optical path of the measurement light;

a light receiver (140) configured to receive the interference light from the interferometer to convert the interference light to an electric signal;

a processor (150) configured to calculate a distance from the sensor head to the measurement target based on the electric signal resulting from conversion performed by the light receiver;

an identifier (160) configured to identify the sensor head based on a beat signal generated by the interferometer; and a setter (170) configured to set a measurement condition corresponding to the sensor head identified by the identifier.

REFERENCE SIGNS LIST

1 sensor system
10 displacement sensor
11 control device
12 sensor for control signal input
13 external connection device
20 sensor head
21 objective lens
22*a* to 22*c* collimating lens
23 lens holder
24 optical fiber array
30 controller
31 display
32 setting unit
33 external interface (I/F)
34 optical fiber connector
35 external storage
36 measurement processor
40 optical fiber
51 wavelength swept light source
52 optical amplifier
53, 53*a*, 53*b* isolator
54, 54*a* to 54*e* optical coupler
55 attenuator
56*a* to 56*c* light receiving element
58*a* to 58*c* AD converter
59 processor
60 balance detector
61 correction signal generator
71*a* to 71*e* light receiving element
72*a* to 72*c* amplifier circuit
74*a* to 74*c* AD converter
75 processor
76 differential amplifier circuit
77 correction signal generator
100, 200 optical interferometric range sensor
101 controller
110 wavelength swept light source
120, 121 light splitter
130 interferometer
131, 131*a*, 131*b* sensor head
132, 132*a*, 132*b* objective lens
133*a*, 133*b* reference surface
134*a*, 134*b*, 136*a*, 136*b*, 138, 139 reflective surface
135*a*, 135*b* collimating lens
137*a*, 137*b* predetermined component
140 light receiver
141 light receiving circuit
142 AD converter
150 processor
160 identifier
170, 270 setter
210 correction signal generator

28

T measurement target
Lm measurement optical path
Lr reference optical path
The invention claimed is:

1. An optical interferometric range sensor, comprising:
a light source configured to emit light with a changing wavelength;
an interferometer configured to receive the light emitted from the light source and generate interference light based on measurement light and reference light, the measurement light being light emitted from a sensor head to a measurement target and reflected from the measurement target, the reference light being light traveling on an optical path at least partially different from an optical path of the measurement light;
a light receiver configured to receive the interference light from the interferometer to convert the interference light to an electric signal;
a processor configured to perform operations comprising:
calculating a distance from the sensor head to the measurement target based on the electric signal resulting from conversion performed by the light receiver;
operation as an identifier configured to identify a type of the sensor head; and
operation as a setter configured to set a measurement condition corresponding to the type of the sensor head identified by the identifier.

2. The optical interferometric range sensor according to claim 1, wherein the processor is configured to perform operations such that operation as the setter comprises adjusting a sweep rate of the light emitted from the light source based on the type of the sensor head identified by the identifier, and the sweep rate represents a frequency sweep width per sweep time.

3. The optical interferometric range sensor according to claim 1, further comprising:
a correction signal generator configured to generate a correction signal for sampling to convert the interference light received by the light receiver to the electric signal,
wherein the processor is configured to perform operations such that operation as the setter comprises adjusting a degree by which a frequency of the correction signal is multiplied based on the type of the sensor head identified by the identifier.

4. The optical interferometric range sensor according to claim 1, wherein the processor is configured to perform operations such that operation as the identifier comprises identifying the type of the sensor head based on;
a beat signal generated by the interferometer; and
at least one of a peak frequency of the beat signal or the number of peaks in the beat signal.

5. The optical interferometric range sensor according to claim 4, wherein
the beat signal results from a portion of the light emitted from the light source and received by the interferometer being reflected from a component of the interferometer comprising a reflective surface is located inside the sensor head.

6. The optical interferometric range sensor according to claim 5, wherein
the reflective surface is located on an objective lens comprised in the sensor head.

7. The optical interferometric range sensor according to claim 5, wherein
the reflective surface is located on a collimating lens comprised in the sensor head.

8. The optical interferometric range sensor according to claim 4, wherein the beat signal results from a portion of the light emitted from the light source and received by the interferometer being reflected from a component of the interferometer comprising a reflective surface is located inside an optical fiber configured to guide the light emitted from the light source to the sensor head.

9. The optical interferometric range sensor according to claim 2, further comprising:

a correction signal generator configured to generate a correction signal for sampling to convert the interference light received by the light receiver to the electric signal, wherein the processor is configured to perform operations such that operation as the setter comprises adjusting a degree by which a frequency of the correction signal is multiplied based on the type of the sensor head identified by the identifier.

10. The optical interferometric range sensor according to claim 2, wherein the processor is configured to perform operations such that operation as the identifier comprises identifying the type of the sensor head based on;

a beat signal generated by the interferometer; and at least one of a peak frequency of the beat signal or the number of peaks in the beat signal.

11. The optical interferometric range sensor according to claim 3, wherein the processor is configured to perform operations such that operation as the identifier comprises identifying the type of the sensor head based on;

a beat signal generated by the interferometer; and at least one of a peak frequency of the beat signal or the number of peaks in the beat signal.

12. The optical interferometric range sensor according to claim 10, wherein the beat signal results from a portion of the light emitted from the light source and received by the interferometer being reflected from a component of the interferometer comprising a reflective surface.

13. The optical interferometric range sensor according to claim 11, wherein the beat signal results from a portion of the light emitted from the light source and received by the interferometer being reflected from a component of the interferometer comprising a reflective surface.

14. The optical interferometric range sensor according to claim 4, wherein the beat signal results from a portion of the light emitted from the light source and received by the interferometer being reflected from a component of the interferometer comprising a reflective surface.

15. The optical interferometric range sensor according to claim 5, wherein the reflective surface is located on a collimating lens comprised in the sensor head.

16. The optical interferometric range sensor according to claim 5, wherein the reflective surface is located inside an optical fiber configured to guide the light emitted from the light source to the sensor head.

\* \* \* \* \*